United States Patent
Plank S. et al.

(10) Patent No.: US 11,455,094 B2
(45) Date of Patent: Sep. 27, 2022

(54) INTERACTIVE VIRTUAL KEYBOARD CONFIGURED FOR GESTURE BASED WORD SELECTION AND HAVING A PLURALITY OF KEYS ARRANGED APPROXIMATELY RADIALLY ABOUT AT LEAST ONE CENTER POINT

(71) Applicant: Thumba Inc., San Francisco, CA (US)

(72) Inventors: Andras Plank S., Walnut Creek, CA (US); Gabor A. Rab, Budapest (HU)

(73) Assignee: Thumba Inc., San Francisco, CA (US)

( * ) Notice: Subject to any disclaimer, the term of this patent is extended or adjusted under 35 U.S.C. 154(b) by 638 days.

(21) Appl. No.: 16/030,755

(22) Filed: Jul. 9, 2018

(65) Prior Publication Data
US 2019/0018583 A1    Jan. 17, 2019

Related U.S. Application Data

(60) Provisional application No. 62/530,850, filed on Jul. 11, 2017.

(51) Int. Cl.
*G06F 3/04883*  (2022.01)
*G06F 3/04886*  (2022.01)
(Continued)

(52) U.S. Cl.
CPC ...... *G06F 3/04883* (2013.01); *G06F 3/04842* (2013.01); *G06F 3/04886* (2013.01);
(Continued)

(58) Field of Classification Search
CPC ............ G06F 3/04883; G06F 3/04886; G06F 3/0489; G06F 3/04895; G06F 3/04897;
(Continued)

(56) References Cited

U.S. PATENT DOCUMENTS

| | | | | |
|---|---|---|---|---|
| 5,818,437 A | * | 10/1998 | Grover ................. | G06F 3/0219 715/811 |
| 6,011,554 A | * | 1/2000 | King ..................... | G06F 3/0237 715/811 |

(Continued)

FOREIGN PATENT DOCUMENTS

HU        P1100505 A2     4/2013

OTHER PUBLICATIONS

Wikipedia, "T9 (predictive text)" Wikipedia, Apr. 2018, 3 pages retrieved from https://en.wikipedia.org/wiki/T9_(predictive_text).

(Continued)

*Primary Examiner* — William Boddie
*Assistant Examiner* — Saifeldin E Elnafia
(74) *Attorney, Agent, or Firm* — Fish & Richardson P.C.

(57) ABSTRACT

A method according to one embodiment includes detecting a first touch event on a touch-sensitive input area of a display, the touch-sensitive input area having groups of virtual ambiguous keys arranged approximately radially about a center point. The method further includes determining a plurality of words based on the detected first touch event, outputting at least two of the determined words to a list on a first portion of the display, and in response to detecting a gesture based second touch event in a predefined area of the touch-sensitive input area, changing the list on the display. The method further includes outputting at least one of the words in the list to a second portion of the display in response to detecting a tap based second touch event in an area selected from the group consisting of: the predefined area and the first portion of the display.

20 Claims, 17 Drawing Sheets

(51) Int. Cl.

| | |
|---|---|
| *G06F 3/04842* | (2022.01) |
| *G06F 3/0482* | (2013.01) |
| *G06F 3/04895* | (2022.01) |
| *G06F 3/0487* | (2013.01) |
| *G06F 3/0489* | (2022.01) |
| *G06F 40/20* | (2020.01) |
| *G06F 3/0488* | (2022.01) |

(52) U.S. Cl.
CPC .......... *G06F 3/0482* (2013.01); *G06F 3/0487* (2013.01); *G06F 3/0488* (2013.01); *G06F 3/0489* (2013.01); *G06F 3/04895* (2013.01); *G06F 3/04897* (2013.01); *G06F 40/20* (2020.01)

(58) Field of Classification Search
CPC .. G06F 3/0488; G06F 3/0487; G06F 3/04842; G06F 3/0482; G06F 40/20
See application file for complete search history.

(56) References Cited

U.S. PATENT DOCUMENTS

| | | | |
|---|---|---|---|
| 7,199,786 B2 | 4/2007 | Suraqui | |
| 8,484,573 B1 | 7/2013 | Zhai | |
| 8,504,934 B1 | 8/2013 | Yu | |
| 8,681,124 B2 | 3/2014 | Bamji | |
| 8,751,970 B2 | 6/2014 | Yatani | |
| 8,884,872 B2 | 11/2014 | Kushler | |
| 9,122,672 B2 | 9/2015 | Pasquero | |
| 9,146,672 B2 | 9/2015 | Hicks | |
| 9,304,602 B2 | 4/2016 | Ghassabian | |
| 9,310,889 B2 | 4/2016 | Pinheiro | |
| 9,317,201 B2 | 4/2016 | Diao | |
| 9,400,782 B2 | 7/2016 | Van Meurs | |
| 9,547,375 B2 | 1/2017 | Lee | |
| 9,690,391 B2 | 6/2017 | Berglund | |
| 9,891,820 B2 | 2/2018 | Luo | |
| 2004/0104896 A1* | 6/2004 | Suraqui | G06F 3/0237 345/168 |
| 2005/0283358 A1* | 12/2005 | Stephanick | G06F 3/0236 704/7 |
| 2007/0256029 A1* | 11/2007 | Maxwell | G06F 3/0482 715/834 |
| 2010/0277414 A1* | 11/2010 | Tartz | G06F 1/1626 345/169 |
| 2012/0117506 A1 | 5/2012 | Koch | |
| 2012/0162078 A1 | 6/2012 | Ferren | |
| 2012/0188174 A1 | 7/2012 | Migos | |
| 2013/0120267 A1 | 5/2013 | Pasquero | |
| 2013/0234942 A1* | 9/2013 | Yoo | G06F 1/1673 345/168 |
| 2013/0307767 A1* | 11/2013 | Fujiwara | G06F 3/03 345/156 |
| 2014/0098024 A1* | 4/2014 | Paek | G06F 3/04883 345/168 |
| 2014/0098036 A1* | 4/2014 | Paek | G06F 3/023 345/173 |
| 2015/0062647 A1 | 3/2015 | Miyazawa | |
| 2015/0149947 A1 | 5/2015 | Bi | |
| 2015/0253870 A1 | 9/2015 | Ikeda | |
| 2017/0199665 A1 | 7/2017 | Zhai | |
| 2017/0206002 A1 | 7/2017 | Badger | |
| 2017/0206003 A1 | 7/2017 | Paek | |
| 2017/0206193 A1 | 7/2017 | Bi | |
| 2017/0235482 A1 | 8/2017 | Ferren | |
| 2017/0256029 A1 | 9/2017 | Shams | |
| 2018/0300056 A1 | 10/2018 | Buxton | |

OTHER PUBLICATIONS www.idownloadblog.com, Jeff Benjamin, SwipeSelectionPro, "SwipeSelection Pro: one of the best jailbreak tweaks of all time just got better", Internet URL: https://www.idownloadblog.com/2014/01/14/swipeselection-pro-one-of-the-best-jailbreak-tweaks-of-all-time-just-got-better/, Retrieved from Internet May 4, 2020, dated Jan. 14, 2014, iDownload Blog, U.S.A., 13 pages.

www.web.archive.org, R_Plus, SwipeShiftCaret, Internet URL: https://web.archive.org/web/20141119065009/http://cydia.saurik.com/package/jp.r-plus.swipeshiftcaret/, Retrieved from Internet May 4, 2020, dated Nov. 2014, Big Boss Software, Hillsboro, OR, U.S., 2 pages.

www.web.archive.org, Kyle Howells, "SwipeSelectionPro", Internet URL: https://web.archive.org/web/20151207224319/http:/cydia.saurik.com/package/com.ikyle.swipeselection-pro/, Retrieved from Internet May 4, 2020, dated Dec. 2015, Hillsboro, OR, U.S., 2 pages.

www.web.archive.org, R_Plus, "DeleteCut", Internet URL: https://web.archive.org/web/20151126004332/http:/cydia.saurik.com/package/jp.r-plus.deletecut/, Retrieved from Internet May 4, 2020, dated Nov. 2015, Big Boss Software, Hillsboro, OR, U.S, 1 page.

www.web.archive.org, R_Plus, "SlideCut", Internet URL: https://web.archive.org/web/20170321203124/http:/cydia.saurik.com/package/jp.r-plus.slidecut/, Retrieved from Internet May 4, 2020, dated Mar. 2017, Big Boss Software, Hillsboro, OR, U.S., 1 page.

\* cited by examiner

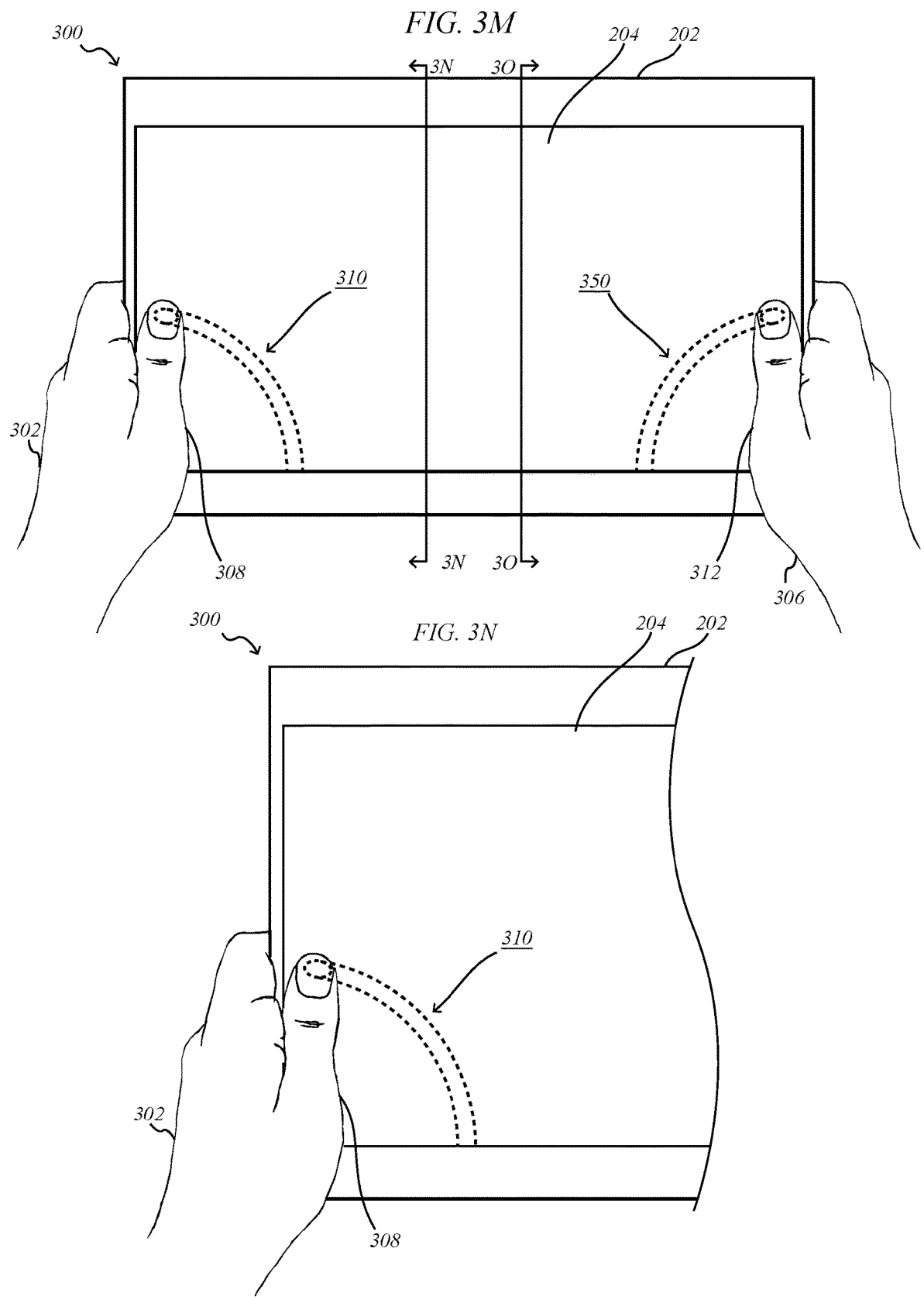

INTERACTIVE VIRTUAL KEYBOARD CONFIGURED FOR GESTURE BASED WORD SELECTION AND HAVING A PLURALITY OF KEYS ARRANGED APPROXIMATELY RADIALLY ABOUT AT LEAST ONE CENTER POINT

RELATED APPLICATIONS

This application claims priority to U.S. Provisional Patent Appl. No. 62/530,850, filed on Jul. 11, 2017 and entitled "Method for selecting predefined options of set of characters and text entry" which is herein incorporated by reference.

FIELD OF THE INVENTION

The present invention relates to text input systems, and more particularly, this invention relates to interactive touch-based virtual keyboards.

BACKGROUND

Currently, touch-based input methods, such as touchscreen keyboards typically used on touchscreen devices, are widely utilized. These virtual keyboards are usually oriented in accordance with a "QWERTY" keyboard layout (or its variations) consisting of dozens of small virtual keys spread usually uniformly across a particular displayed keyboard.

These virtual keyboard implementations however often provide only limited typing comfort. For example, when holding a device displaying such a keyboard, some keys typically reside out of reach of a user's fingers, and therefore a user is forced to frequently adjust handling orientations of the device in order to utilize the keyboard, which results in reduced typing speeds. Moreover, a user may unintentionally drop the device displaying the virtual keyboard while adjusting handling orientation of the device, which may result in significant damage and/or loss of functionality of the device.

Furthermore, because virtual keys of conventional virtual keyboards are often small in size (such as to fit each of the 26 letters of the English alphabet on different keys) relative to the average human thumb (which is often used to select virtual keys), typing accuracy is often compromised on conventional virtual keyboards.

SUMMARY

A method according to one embodiment includes detecting a first touch event on a touch-sensitive input area of a display, the touch-sensitive input area having groups of virtual ambiguous keys arranged approximately radially about a center point. The method further includes determining a plurality of words based on the detected first touch event, outputting at least two of the determined words to a list on a first portion of the display, and in response to detecting a gesture based second touch event in a predefined area of the touch-sensitive input area, changing the list on the display. The method further includes outputting at least one of the words in the list to a second portion of the display in response to detecting a tap based second touch event in an area selected from the group consisting of: the predefined area and the first portion of the display.

A computer program product according to one embodiment includes a computer readable storage medium having stored thereon computer readable program instructions configured to cause a processor of a computer system to perform the foregoing method.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 3M is a front side view of a touch-sensitive display and a user's hands, in accordance with one embodiment.

FIG. 3N is a partial front side view of a touch-sensitive display and a user's hand, taken along line 3N of FIG. 3M, in accordance with one embodiment.

DETAILED DESCRIPTION

Figure 1:
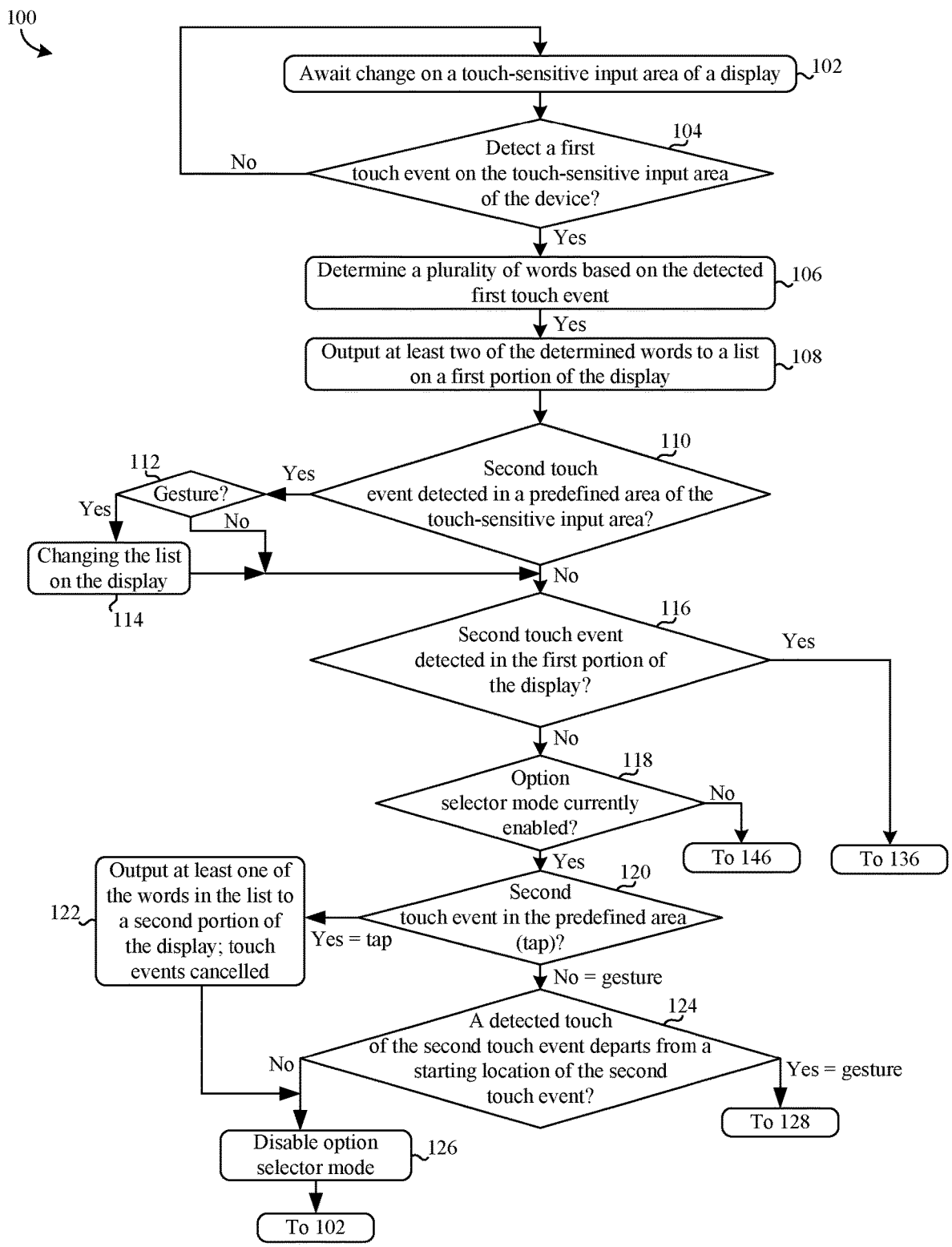
FIG. 1 is a flowchart of a method, in accordance with one embodiment.
Figure 1:
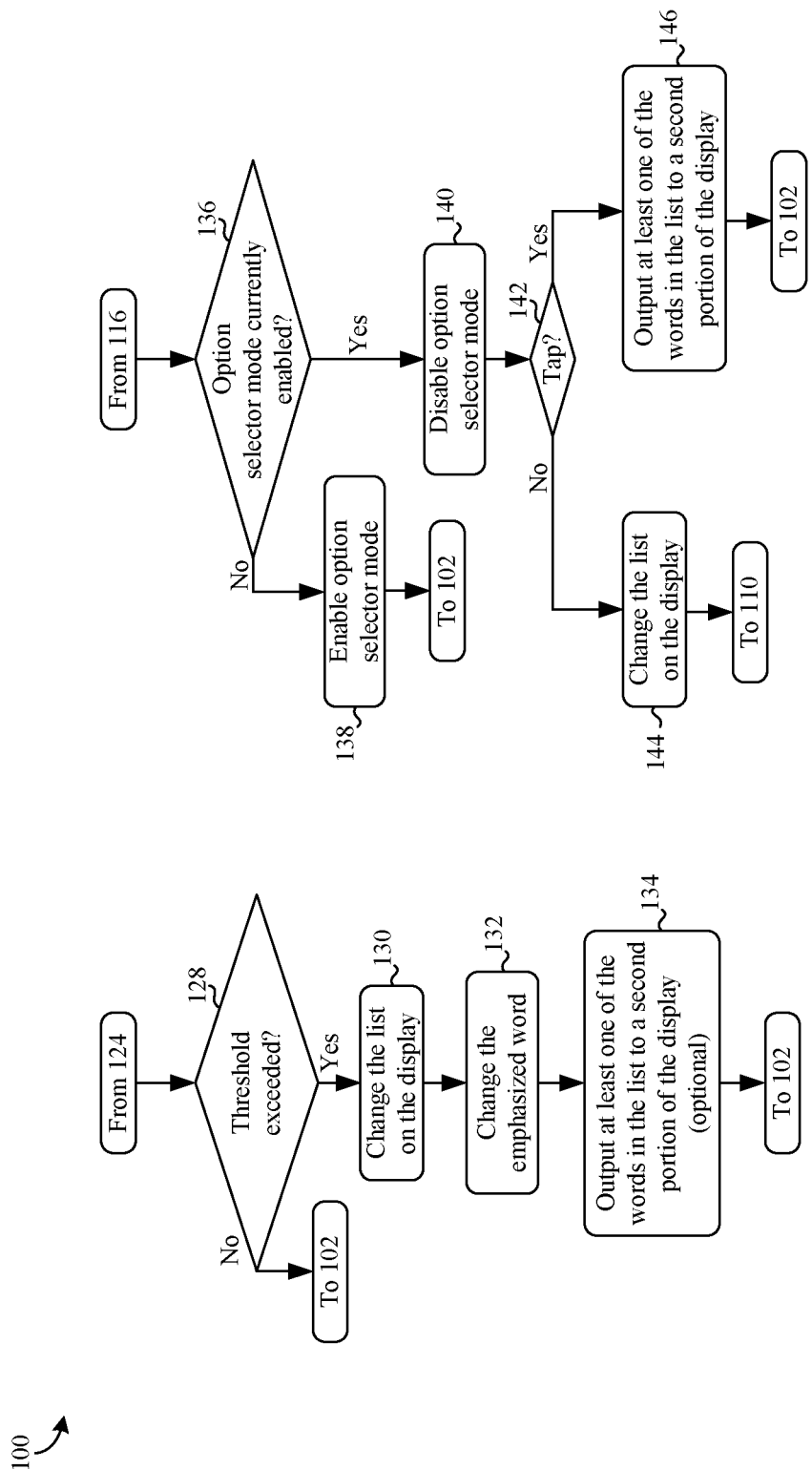

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of interactive touch-based virtual keyboards having groups of virtual ambiguous keys configured for gesture input based selection of characters/words for outputting and/or related systems and methods.

In one general embodiment, a method includes detecting a first touch event on a touch-sensitive input area of a display, the touch-sensitive input area having groups of virtual ambiguous keys arranged approximately radially about a center point. The method further includes determining a plurality of words based on the detected first touch event, outputting at least two of the determined words to a list on a first portion of the display, and in response to detecting a gesture based second touch event in a predefined area of the touch-sensitive input area, changing the list on the display. The method further includes outputting at least one of the words in the list to a second portion of the display in response to detecting a tap based second touch event in an area selected from the group consisting of: the predefined area and the first portion of the display.

In another general embodiment, a computer program product includes a computer readable storage medium having stored thereon computer readable program instructions configured to cause a processor of a computer system to perform the foregoing method.

Conventional keyboards, and particularly conventional virtual keyboards, commonly implement a standard "QWERTY" keyboard layout (or its variations) configured for typing thereon. For a user, these keyboards are often difficult to type on. This is because the each of the characters of such keyboards are often designated to a different key of the keyboard, which together constitute a relatively vast plurality of spaced keys.

Accordingly, such conventional virtual keyboard implementations often provide only limited typing comfort. Moreover, users are prone to dropping the device displaying such conventional keyboards, such as while standing and typing on a device displaying the conventional virtual keyboard, as a result of having to adjust the handling orientation of the device while typing to reach such keys. This is particularly problematic for mobile computer devices, which are useful but fragile. This can be very expensive, as dropping such devices often results in significant damage and/or loss of functionality of the device being typed on. Learning how to type on such conventional keyboards is also no easy task, and often takes months if not years to develop proficiency at.

Various embodiments described herein include traversal of determined/predicted words and/or selection of determined/predicted words on a display having virtual ambiguous keys arranged approximately radially about at least one center point. Such virtual ambiguous keys are notably configured for utilizing tap based and/or gesture based touch events for enabling efficient typing thereon.

FIG. 1 show method 100 for selection of at least one word for outputting to a display, in accordance with one embodiment. As an option, the present method 100 may be implemented to devices such as those shown in the other FIGS. described herein. Of course, however, such method 100 and others presented herein may be used for facilitating efficient text input on a device which may or may not be related to the illustrative embodiments listed herein. Further, the methods presented herein may be carried out in any desired environment. Moreover, more or less operations than those shown in FIG. 1 may be included in method 100, according to various embodiments. It should also be noted that any of the aforementioned features may be used in any of the embodiments described in accordance with the various methods.

It should be noted that various operations of method 100 will be described herein to be performed on a display, e.g., such as on a touch-sensitive input area on a display of a device. According to various approaches, the display may be any known type of display. For example, the display may preferably be a touch-sensitive display. Various examples of such devices and/or displays will be described in other various approaches and/or embodiments described elsewhere herein, e.g., see FIGS. 2-7.

It should be prefaced however, that in various approaches, method 100 may be implemented on a computer system having one or more processors operatively coupled to a memory component with at least one electronic visual display that is configured for displaying text and editing text, referred to collectively herein as a computer, and is connected to via wireless or wired connection, or incorporates, a touch-sensitive input interface that embodies a plurality of virtual ambiguous keys, that can be utilized for inputting text to the computer. In some approaches, the computer can be a wired communication device (for example, a laptop computer having a touch screen); a mobile or handheld wireless communication devices such as cellular phones, smartphones, wireless organizers, personal digital assistants, wirelessly enabled notebook, tablets and similar devices; a computer with or without wireless communication capabilities, such as a handheld electronic game device, game controller, digital photograph album, digital camera; or any other device.

Operation 102 of method 100 includes awaiting change on a touch-sensitive input area of a display. For descriptive purposes, a change on a touch-sensitive input area of a display may include receiving (on the touch-sensitive input area of a display) any type of input. For example, in one approach, a received input may include a touch event. In various more specific approaches, a touch event may be initiated in response to detecting that an object, e.g., a surface of a user's finger, a plastic tipped stylus, an electronic device, etc., comes into contact with a touch-sensitive input area of a display.

Accordingly, method 100 includes detecting a first touch event on a touch-sensitive input area of a display, e.g., see "Yes" logical path of decision 104.

Although in some approaches, a first touch event may begin with contact being initially made with the touch-sensitive input area of a display, the first touch event may include one or more tap touch events. According to another approach, the first touch event may additionally and/or alternatively be a gesture, e.g., thereby a gesture based first touch event. For example, according to various approaches, the detected first touch event may include an initial touching of the touch-sensitive input area of the display, and moreover may include any detected continued touching of the touch-sensitive input area of the display thereafter. Accordingly, a gesture based touch event may include a starting location and an ending location.

Accordingly, in the present approach, detecting the first touch event of decision 104 may include determining a starting location of the gesture on the touch-sensitive input area, and an ending location of the gesture on the touch-sensitive input area. In one approach, the starting location of the gesture on the touch-sensitive input area may be the location at which the gesture was initially detected. Moreover, in another approach, the ending location of the gesture on the touch-sensitive input area may be a location at which the gesture was last detected.

According to various approaches, one or more touch events, e.g., such as the first touch event, may be associated with typing on the touch-sensitive input area of the display. Accordingly, the touch-sensitive input area may include groups of virtual ambiguous keys arranged approximately radially about at least one center point. For reference, use of the term "ambiguous" of virtual ambiguous key(s) is intended to correspond to such keys including any predetermined characters. For example, the virtual ambiguous keys may include any number (preferably at least two) of characters, e.g., letters, numbers, emojis, etc. It should be noted that such characters may be modified to include any known characters of any known language and/or type.

In a preferred approach, the number of characters assigned to a particular virtual ambiguous key may be three or four. In other approaches, the number of characters assigned to a particular virtual ambiguous key may be two to five. For example, a virtual ambiguous key including the characters "ABC" is associated to a key identifier sequence that is associated to either "a", "b" or "c" characters. This key is also associated to characters "a", "b" and "c". In a preferred approach eight virtual ambiguous keys may include the characters: "ABC", "DEF", "GHI", "JKL", "MNO", "PQRS", "TUV", and "WXYZ". In other approaches, these associations can be of any set of characters or phrases or syllabics of any language, for example German characters or japan syllabics. In some approaches, displayed characters and the set of characters of the key identifier sequence are not the same. For example, in some languages with different accent on the vowels, a virtual ambiguous key may include the characters "ABC" but the associated set of characters and the associated set of characters of the key identifier sequence may be "a", "á", "b" and "c".

The at least one center point may be located at any location on the touch-sensitive input area of the display. However, in preferred approaches, the center point is located spaced from the corner (away from the display) at about the position of the thumb joint when engaged in typing on the touch-sensitive input area. Positioning the center point spaced from the corner at about the position of the thumb joint when engaged in typing on the touch-sensitive input area allows for a user that utilizes the corners of the display when holding the display to easily select any one or more of the virtual ambiguous keys during associated touch events. For example, in response to the center point being located at about the expected position of a thumb joint, e.g., interphalangeal thumb joint, of a user when the user is engaged in typing on the touch-sensitive input area, the groups of virtual ambiguous keys arranged approximately radially about the center point, may be contacted, e.g., during a touch event, by a user typing on the touch-sensitive input area.

It should be noted that the particular corners of the display at which the center points are spaced from may depend and/or be changed in response to the device (on which method 100 is being performed) rotating. For example, in one approach, in response to determining, e.g., using an accelerometer or orientation sensor 720 of FIG. 7, that a device including the display has been rotated, the overall configuration of the display may also be rotated on the display, e.g., and spaced according to the change in display spacing (if any).

Operation 106 of method 100 includes determining a plurality of words based on the detected first touch event.

According to various approaches, determining a plurality of words based on the detected first touch event may include accessing a known list, e.g., database, word list, character list, etc., which may be used for determining words based on selections of a gesture. Such known list(s) may include information correlating each virtual ambiguous key with an associated one or more key identifier sequences (determined from the detected first touch event). Examples of a plurality of determined words corresponding to a detected touch event will be described in detail elsewhere herein, e.g., see FIG. 2.

With continued reference to FIG. 1, operation 108 of method 100 includes outputting at least two of the determined words to a list on a first portion of the display. According to various approaches, the list may include any number of words, and may serve as an option selector list, of which one or more words may be selected for outputting to a different portion of the display, e.g., as will be described in other operations and/or decisions elsewhere herein. Accordingly, the list may be a compiling of predicted words that are generated in response to detecting the first touch event.

In another approach, method 100 may additionally and/or alternatively include outputting at least two of the determined words to the list on the first portion of the display and a second list on a second portion of the display. In a more specific approach, the location of the second list on the second portion of the display may be the location of a cursor on the display, e.g., see 260 of FIG. 2.

In one approach, at least one of the words output to the list may be based on a previous tap based second touch event that previously selected the particular word for outputting to a different portion on the display. For example, such words may be frequently used/selected words. Accordingly, method 100 may include storing, e.g., user touch patterns, frequently detected first touch event and associated determined and/or selected words, indications of frequently touched portions of the touch-sensitive input area of the display, most commonly utilized virtual ambiguous keys, etc. in a memory component coupled to the device.

Referring again to approaches in which the detected first touch event is a gesture, in one approach an initial order of the list may include an emphasized determined word that most correlates with the gesture. For reference, "most correlates" may be based on a determining of the virtual ambiguous key(s) that the gesture, e.g., trespasses, does not trespass, directionally heads toward, etc. after departing from the starting location of the gesture (preferably the location at which the first touch event is initially detected) toward the ending location of the gesture.

The emphasizing of the determined word that most correlates with the gesture may include any type of emphasizing. For example, in one approach, the emphasized determined word that most correlates with the gesture may be a word that is centered in the list on the first portion of the display. For example, where the list on the first portion of the display includes an odd number of words, the emphasized determined word may be the middle word. In another approach, the emphasized determined word that most correlates with the gesture may additionally and/or alternatively be highlighted. According to another approach, the emphasized determined word that most correlates with the gesture may additionally and/or alternatively be bolded. According to another approach, the emphasized determined word that most correlates with the gesture may additionally and/or alternatively be underlined. According to another approach, the emphasized determined word that most correlates with the gesture may additionally and/or alternatively be italicized.

In a more specific approach, characters of the words in the list on the first portion of the display corresponding to characters selected by the first touch event may be emphasized. Accordingly, the remaining characters (if any) of the words in the list that do not correspond and/or that do not yet correspond to characters selected by the first touch event may not be emphasized. For example, assume that characters "do" correspond to characters selected by a first touch event and that the word "dog" has been output as a determined word to the list on the first portion of the display. According to the present approach, the characters "do" may be emphasized and the character "g" may remain not-emphasized.

Moreover, in some approaches, the remaining words of the list may be sequentially distanced from the emphasized determined word in a decreasing order of degree of correlation with the gesture. As will be soon be described in various operations and/or decisions of method 100, or other various descriptions elsewhere herein, one or more words in the list may be selected for outputting on a different portions the display. Accordingly, in case that the emphasized determined word is not the word that is to be output, sequentially distancing the remaining words of the list from the emphasized determined word in a decreasing order of degree of correlation with the gesture may facilitate proximate word options for selecting. Such proximate word options may be assumed to be one or more next most probable options for outputting. For purposes of an example, words determined to have the second and/or third most degree of correlation with the gesture may border the emphasized determined word.

According to another approach, the at least two determined words may be ordered alphabetically in the list. In an alternative approach, the at least two determined words may be in reverse-alphabetical order in the list. The ordering type and/or emphasizing type may be selectively and/or automatically changed at any desired time.

Decision 110 of method 100 includes determining whether a second touch event was detected in a predefined area of the touch-sensitive input area.

It should be noted that depending on the size of the font of the determined words output to the list on the first portion of the display and/or the size of the list on the display, some of the determined words may not be able to fit within the list on the first portion of the display. Accordingly, in one approach, only some of the determined words may be visually displayed in the list.

In response to detecting a gesture based second touch event in the predefined area of the touch-sensitive input area, the list on the display may be changed, e.g., see decision 112 and operation 114. According to various approaches, changing the list on the display may include, e.g., outputting a rearranged order of the words already shown on the display, outputting different words of the list on the display, changing the font and/or font size of the words in the list so that more words may be displayed, etc.

As will be described in greater detail elsewhere herein, e.g., see FIG. 2, the gesture based second touch event may extend approximately circumferentially about the center point from the starting location to the ending location. Accordingly, the virtual ambiguous keys may be configured for circumferential gestures. The benefits of such gesture types and configurations will also be described in greater detail elsewhere herein.

With continued reference to FIG. 1, decision 116 of method 100 includes determining whether a second touch event has been detected in the first portion of the display. According to one approach the detecting second touch event may be a tap based second touch event. In another approach, the detecting second touch event may be a gesture based second touch event. In response to determining that a second touch event has been detected in the first portion of the display (e.g., as illustrated by the "Yes" logical path of decision 116) decision 136 of method 100 includes determining whether an option selector mode is currently enabled.

According to various approaches, the enabling and/or disabling of modes, e.g., such as the option selector mode, may be utilized for streamlining input and text entry on the touch-sensitive input for a user. For example, according to one approach, while the option selector mode is not enabled, touch events that otherwise might lead to an outputting of at least one of the words in the list to a different portion of the display may not do so. In contrast, while the option selector mode is enabled, touch events may lead to an outputting of at least one of the words in the list to a different portion of the display, e.g., see operation 146.

In response to determining that the option selector mode is currently enabled (e.g., as illustrated by the "Yes" logical path of decision 136) the option selector mode may be disabled, e.g., see operation 140.

Moreover, decision 142 includes determining whether the second touch event was a tap based second touch event.

In response to determining that the second touch event was a tap based second touch event (e.g., as illustrated by the "Yes" logical path of decision 142) in the first portion of the display, at least one of the words in the list may be output to a second portion of the display, e.g., see operation 146.

In one approach, the at least one word in the list output to the second portion of the display may be a word that is closest to and/or at the location on the first portion of the display at which the tap based second touch event was detected.

Moreover, in one approach, the at least one word output to the second portion of the display, e.g., in response to detecting the tap based second touch event, preferably includes a word that was emphasized in the list.

According to various approaches, the second portion of the display may be any portion of the display. In one approach, the second portion of the display may be a current location of a first cursor on the display, e.g., see 260 of FIG.

2. In another approach, the second portion of the display may be the location of a second cursor on the display. In another approach, the second portion of the display may be the location along a line of text and/or characters that was most previously output to. In yet another approach, the second portion of the display may be a predefined location on the display, e.g., such as in predefined text input areas of a template displayed on the display.

However, in one approach, if it is determined that the second touch event is not a tap based second touch event (e.g., as illustrated by the "No" logical path of decision 142), the list on the display may be changed, e.g., see operation 144. In such an approach, the second touch event may be determined to be a gesture based second touch event. Accordingly, the list on the display may be changed in a predefined manner corresponding to the detected second touch event. For example, a detected downward swipe gesture based second touch event may correspond to changing the list to display determined words that are sequentially distanced from the emphasized determined word a predetermined amount. The predetermined amount may have a scalar relationship to a characteristic of the detected downward swipe gesture based second touch event. For example, in one approach, which words are selected for being displayed on the list on the display (as a result of the changing) may be at least based on a time that it is detected to take to traverse from a starting location to an ending location of the detected downward swipe gesture based second touch event.

Referring again to decision 136, in response to determining that the option selector mode is not currently enabled (e.g., as illustrated by the "No" logical path of decision 136) the option selector mode may be enabled, e.g. see operation 138.

It should be noted that in one approach, in response to the option selector mode being enabled, e.g., by performing operation 138, a subsequent performing of method 100 may reflect such a mode being enabled, e.g., see logic of operation 138 return to operation 102. In such an approach, the detected touch events may be forgotten or applied to the subsequent performed operations.

Referring again to decision 116, in response to determining that a second touch event has not been detected in the first portion of the display (e.g., as illustrated by the "No" logical path of decision 116) decision 118 of method 100 includes determining whether the option selector mode is currently enabled.

In one approach, in response to determining that the option selector mode is not currently enabled (e.g., as illustrated by the "No" logical path of decision 118) operation 146 may be performed.

In another approach, in response to determining that the option selector mode is currently enabled (e.g., as illustrated by the "Yes" logical path of decision 118) it may be determined whether a tap based second touch event has been detected in the predefined area, e.g., see decision 120.

In response to determining that a tap based second touch event has been detected in the predefined area, at least one of the words in the list may be output to a second portion of the display, e.g., see operation 122. Moreover, the touch events (the first and/or second touch events) may be cancelled.

Operation 126 of method 100 includes disabling the option selector mode.

In response to determining that a tap based second touch event has not been detected in the predefined area, it may be determined whether a detected touch of the second touch event departs from a starting location of the second touch event, e.g., see decision 124. For example, the detected of the second touch event may depart from the starting location of the second touch event and transition towards some ending location of the second touch event.

In response to determining that the detected touch of the second touch event does not depart from the starting location of the second touch event, the option selector mode may be disabled, e.g., see operation 126.

However, if it is determined that the detected touch of the second touch event departs from the starting location of the second touch event (e.g., as illustrated by the "Yes" logical path of decision 124) the second touch event may be determined to be a gesture based second touch event, e.g., see "Yes=gesture" logic extending from the decision 124.

In one approach, the gesture based second touch event may be determined to not be a tap based second touch event in response to detecting the gesture.

In another approach, a determination that the second touch event is a gesture based second touch event may be based on a decision of whether a distance between the starting location and the ending location of the second touch event is determined to be greater or greater than or equal to a predetermined threshold, e.g., see decision 128. Applying a predetermined threshold to a determination of whether or not the second touch event is a gesture based second touch event gesture may ensure that accidental touch events that are detected, do not result in an unintentional changing of the list on the first portion of the display and/or an unintentional outputting of at least one of the words in the list to a second portion of the display.

Figure 2:
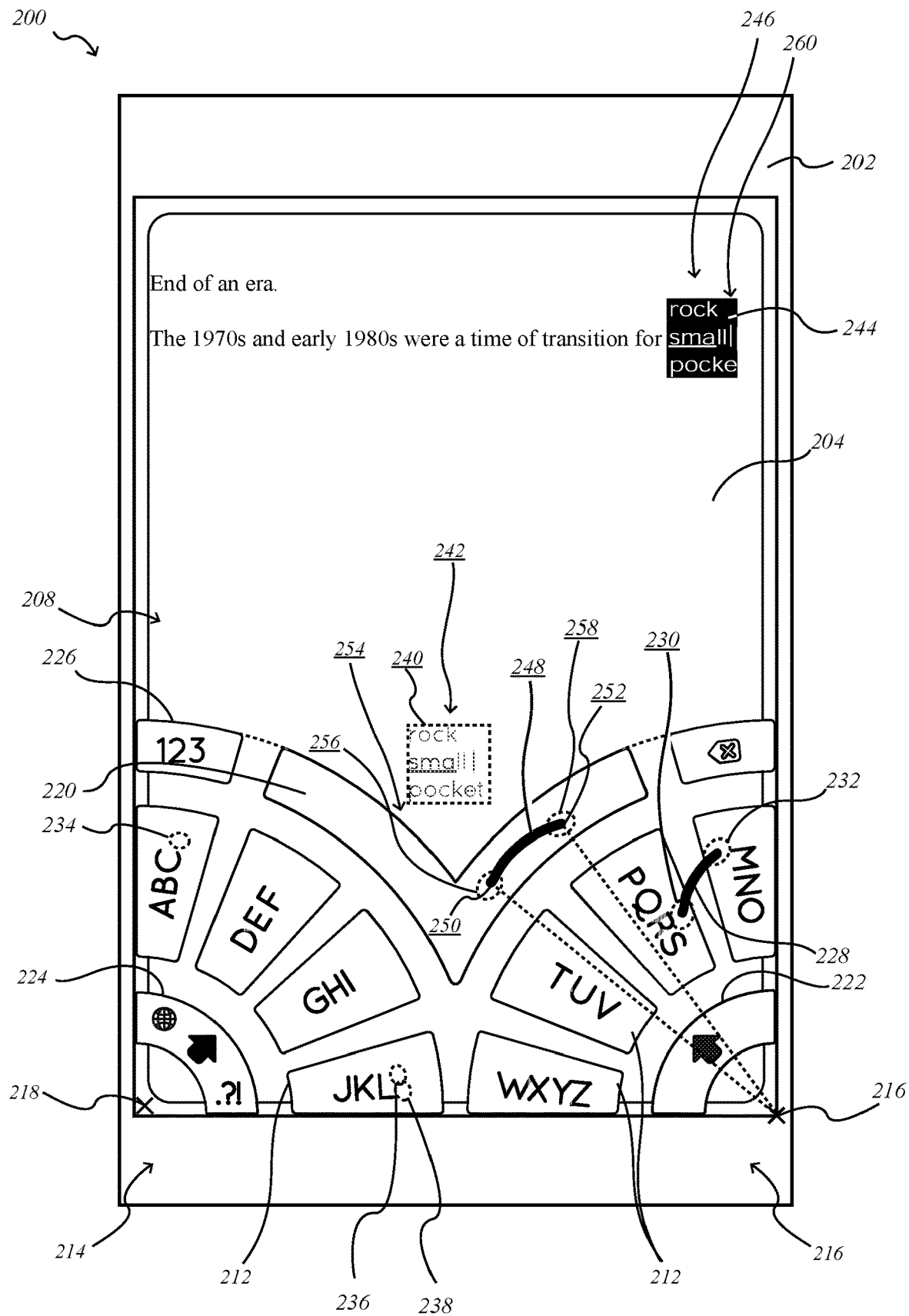
FIG. 2 is a front side view of a touch-sensitive display having groups of virtual ambiguous keys, in accordance with one embodiment.

As will be illustrated in greater detail elsewhere herein, e.g., see FIG. 2, in some approaches, to visually assist a user associated with the first touch event and/or the second touch event, method 100 may optionally include outputting a touch event border that surrounds the location of the detected touch event. The touch event border may indicate a threshold boundary, which after trespassing thereacross, a detected touch event may be determined to be a gesture, e.g., where the touch even includes a gesture if it is determined that the touch event border is trespassed after the touch event departs from the starting location of the touch event.

In response to detecting that a detected touch of the second touch event departs from the starting location of the second touch event and does not exceed the predetermined threshold (upon reaching the ending location of the second touch event), operation 102 may be performed.

In contrast, in response to detecting that a detected touch of the second touch event departs from the starting location of the second touch event and does exceed the predetermined threshold (upon reaching the ending location of the second touch event), any one or more of operations 130-134 may be performed.

For example, in one approach, operation 130 of method 100 includes changing the list on the first portion of the display.

Moreover, operation 132 of method 100 includes changing the emphasized word in the list on the first portion of the display.

Optional operation 134 of method 100 includes outputting at least one of the words in the list to the second portion of the display. In one approach, at least one of the words output to the display may be the most recently emphasized word upon detection of the second touch event reaching the ending location of the gesture based second touch event.

In other words, in one approach, the gesture based second touch event may be used to for changing the emphasized word on the first portion of the display that are designated (by the emphasizing) to be for outputting to the second portion of the display (e.g., operations 130-132) upon the gesture based second touch event reaching an ending location. In contrast, the emphasized word may be output to the second portion of the display (e.g., operation 134) upon losing detection of the gesture based second touch event.

In one approach, a touch event may be determined to be suspended in response to at least temporarily no longer detecting the touch event. For example, assume that the second touch event is detected after a user contacts the touch-sensitive input area of a device. Moreover, assume that the user subsequently stops contacting the touch-sensitive input area of the device. Because the user may have only temporarily retracted contact of the touch-sensitive input area of the device, method 100 may include suspending further operations until the second touch event is again detected, e.g., see operation 126 continuing to operation 102. Accordingly, the detected touch events may be cancelled and/or subsequently resumed.

According to one approach, method 100 may include determining whether the first touch event or the second touch event are not detected at some time after the first touch event and the second touch event are detected. Accordingly, method 100 may include determining if one of the touch events, e.g., a touch event that was for some duration of time no longer detected after being previously detected, is again detected, e.g., "resuming". Accordingly, both the first touch event and/or the second touch event may be detected in order to resume the touch event.

It should be noted that there are a number of user actions that may lead to a loss of detection of the first touch event and/or the second touch event. For example, assume that a user is holding the device and a detected first touch event and a detected second touch event correspond to a user's thumbs contacting the touch-sensitive input area of the device. A loss of detection of one of the detected touch events may stem from the user at least temporarily breaking thumb contact with the touch-sensitive input area of the device while reaching for a cup of coffee, while the remaining touch event may remain detected as the user continues to hold the device and contact the touch-sensitive input area of the device with the user's other hand. Accordingly, a resuming of detection of both the first touch event and the second touch event may occur upon the user again contacting the touch-sensitive input area at two different portion of the touch-sensitive input area of the device.

In another approach, in the context of gestures described elsewhere herein, a loss of detection may result from a user performing a series of swipe gestures, e.g., for changing the emphasized word and/or changing the list on the display a series of times. Accordingly, according to various approaches, the first and/or the second touch events may include a series of similar gestures. In any of such approaches, a suspending and subsequent resuming may occur after each gesture ends.

It should be noted that in one or more approaches, more than one of the determined words may be output to the second portion of the display. For example, in one approach, at least two of the determined words may be output to the second portion of the display in response to detecting a second gesture based touch event. For example, the second gesture based touch event may include one or more downward swipe gesture(s).

Moreover, an optional operations of method 100 may include an operation for resizing one or more of the virtual ambiguous keys.

For example, in one approach, method 100 includes detecting a predetermined resizing touch event on the touch-sensitive input area of the display. The resizing touch event may include a gesture, where detecting the resizing touch event may include determining a starting location of the gesture on the touch-sensitive input area, and an ending location of the gesture on the touch-sensitive input area. In some approaches a gesture may be determined to be a resizing touch event in response to the starting location of the gesture being located on a predetermined virtual ambiguous key and/or location the touch sensitive display that is used for resizing one or more of the virtual ambiguous keys.

In a more specific approach, the span of the distance between the starting location and the ending location of the gesture may be used for determining the updated size of the one or virtual ambiguous keys that are to be resized. It should be noted, that in preferred approaches, the ending location of the gesture may be at the furthest location that a user's thumb can extend across the display when the user's thumb joint is positioned at about a center point. Accordingly, none of the virtual ambiguous keys would be spaced beyond the reach of the user's thumb (without having to readjust the user's handling of the device on which method 100 is being performed). It should be noted that, a user not having to adjust his/her grip of a device while typing thereon will significantly increase the proficiency of the user when typing thereon. Accordingly, various embodiments and/or approaches described herein are configured to assist user's typing proficiency while learning how to type, and thereafter. Again this is not the case with conventional keyboards, which often include only a single character per key, arranged across numerous rows, because users are often forced to adjust handling of a device and/or strain to reach such conventional keys.

It should be noted that after resizing and/or initially sizing the virtual ambiguous keys, any resizing indicator that might have been previously displayed on a virtual ambiguous key may no longer be displayed or remain displayed, depending on the approach. In other approaches, if desirable, such a resizing indicator may remain displayed on the display.

Accordingly, method 100 may include outputting the groups of virtual ambiguous keys with an updated size in response to the starting location of the gesture being located at a corner of the touch-sensitive input area of the display, and the ending location of the gesture being located away from the starting location of the gesture. In one approach, a difference between the updated size of the groups of virtual ambiguous keys and an original size of the groups of virtual ambiguous keys may correspond to a predetermined scaler of the distance between the starting location and the ending location of the gesture.

It should be noted that during testing of the various embodiments and approaches described herein, such as on a device configured for performing method 100, inventors uncovered surprising results. Such surprising results include that during testing, within less than forty-five minutes, or the equivalent of a single school class, testing subjects were able learn and proficiently type on a device having the virtual ambiguous keys described herein and being configured for performing method 100. Specifically, the results on ten different testing sessions collectively produced near a twenty-five words per minute typing speed median. In particular, this proficient typing was performed while some of such test subject did not need to look at the keyboard described in various embodiments herein (once learned), other than for periodically viewing the first position on the display, while engaged in typing thereon. Such results were particularly useful in cases where the display was divided into a handheld portion and a viewing portion, e.g., see FIG. 6.

One of ordinary skill in the art would not expect such a fast learning curve for testing subjects learning to type on conventional typing devices. This is because it is predicted that learning how to generally use a conventional computer keyboard without looking at the keyboard while typing thereon may take about fifty hours of initial practice. Moreover, such conventional keyboards often require users to use eight to ten fingers to achieve moderate typing speeds. As conventional keyboards with one character per key are condensed onto smaller devices, such as a phone that may force a user to type with thumbs, learning how to type thereon, and moreover how to type efficiently thereon becomes substantially more difficult. In sharp contrast, various embodiments and approaches described herein streamline the process of learning how to efficiently enter text on an electronic device using a virtual keyboard that utilizes natural thumb movement and unique gestures, e.g., circumferential gestures.

In addition to the surprising results offered by various embodiments described herein, it should be further noted that various embodiments and approaches described herein benefit a global population of people that use electrical devices, such as computers, tablets, hand held touch screen displays, etc.

For example, as a result of implementing various embodiments and/or approaches described herein on a device, users typing on the ambiguous keys will have to make less keystrokes. For example, as described in various operations and/or decisions of method 100, at least one word may be output for display on the device by mere gesture touch events. This is not the case with keyboards/text entry on conventional devices with require accurate and extensive keystrokes to spell out words when typing. Considering that the English alphabet includes twenty-six letters, the burden associated with using conventional keyboard/text entry (which space such characters on rows of spaced single character keys) in comparison to the benefits offered by embodiments and approaches described herein becomes apparent (as a result of reading the descriptions herein).

Of course, with less keystrokes being made, less keystrokes are processed as a result embodiments and/or approaches herein, e.g., than would otherwise be processed by a conventional device processor that would otherwise process each character keystroke of each word. This will result in less operations being processed by a computer. Accordingly, the processing potential of computers will also improve as a direct result of embodiments and approaches described herein.

Moreover, it should be considered that people who undergo learning how to proficiently type are often youth, such as children in schools. Of course, such youth often are responsible for learning much more than how to type while in school. For example, students often are assigned to mathematics classes, history classes, science classes, etc. This can be very burdensome to balance all at the same time. Accordingly, as a direct result of implementing various embodiments and approaches described herein into devices that such youth uses, youth will be able to learn to proficiently type on an electronic device very efficiently in comparison to conventional devices. Moreover, as a result, youth will be afforded more time to study other important subject, and furthermore, at a young age, develop the skill of typing on an electronic device more quickly than would otherwise be available using conventional keyboards for text entry to a display.

Moreover, with a reduced number of keystrokes being made, there also may be a reduction in noise that might otherwise be present during typing on a touch sensitive input area. It should be noted however, that typing on the touch sensitive input area of various approaches described herein may be minimal to begin with. Of course, in some approaches, where sensory feedback is desirable, method 100 may include outputting a sensory feedback, e.g., noise, vibration, etc., in response to detecting a touch event.

FIG. 2 depicts a system 200, in accordance with one embodiment. As an option, the present system 200 may be implemented in conjunction with features from any other embodiment listed herein, such as those described with reference to the other FIGS. Of course, however, such system 200 and others presented herein may be used in various applications and/or in permutations which may or may not be specifically described in the illustrative embodiments listed herein. Further, the system 200 presented herein may be used in any desired environment.

System 200 includes a device 202. It should be noted that although the device 202 is illustrated to be a tablet device, in other approaches, the device 202 may be any type of device, e.g., such as a cellular phone, or any other device prefaced elsewhere herein, e.g., see descriptions of method 100.

The device 202 includes a display 204 having a touch-sensitive input area 208. The touch-sensitive input area 208 may include groups of virtual ambiguous keys arranged approximately radially about at least one center point. For example, the touch-sensitive input area 208 includes a first group 210 of virtual ambiguous keys 212 arranged approximately radially about a first center point 216 and a second group 214 of virtual ambiguous keys 212 arranged approximately radially about a second center point 218.

In one approach, the first center point 216 may be located at about a corner of the display 204. Moreover, the second center point 218 may be located at about a corner of the display 204, e.g., which is preferably a different corner than the corner that the first center point 216 is located at.

It should be noted that the first and second center points 216, 218 are illustrated in FIG. 2 for purposes of an example only. This is because in various approaches the center points 216, 218 may not be visible to a user holding and/or typing on the device 202, but rather be descriptive references of points that the groups 210, 214 of virtual ambiguous keys 212 are arranged approximately radially about. Moreover, the center points 216, 218 are provided for purposes of an example in FIG. 2, and thus center points described herein should not be interpretively limited thereto. In other words, different configurations of other virtual ambiguous keys that would be apparent to one skilled in the art upon reading the descriptions may change the location of such center points. However, it should be noted that in some approaches, at least one of the center points 216, 218 may preferably located spaced from a corner of the device 202 and/or display 204 at about the position of the thumb joint of a user when engaged in typing and/or performing gestures on the touch-sensitive input area 208 of the device 202.

In the present approach, although the touch-sensitive input area 208 includes thirteen virtual ambiguous keys 212 in total, the total number of virtual ambiguous keys 212 displayed on the display 204 may change at any time, e.g., based on a resizing event occurring, based on an updating of characters of the virtual ambiguous keys 212, based on an enabling and/or disabling of the option selector mode, etc.

It should be noted that the touch-sensitive input area 208 may reside on a portion of the device, or in some approaches, the entire device. For example, in some approaches, the device may include the touch-sensitive input area 208 and the system 200 may include a separate display, as will be described in other embodiments and/or approaches elsewhere herein, e.g., see FIG. 6.

Each of the virtual ambiguous keys 212 may include at least one character. However some of the virtual ambiguous keys designated for particular functions may not include any characters. For example, in various approaches, some virtual ambiguous keys may correspond to particular functions. For example, the touch-sensitive input area 208 of the present approach includes a delete virtual ambiguous key 206, a virtual ambiguous key 220 that may be used for any one or more of, e.g., a space function, being a predefined area for detected gesture and/or tap based second touch events, cursor adjustment and/or facilitating selection functions, etc., one or more virtual ambiguous keys (224, 226) that may be used for updating characters and/or type(s) of characters of one or more virtual ambiguous keys 212 of at least one of the groups 210, 214, initiating a shift function (virtual ambiguous key 222), initiating a control function, etc. Accordingly, for descriptive purposes, it should be noted that while such specific function keys were originally referenced as "virtual ambiguous keys 212," the keys with specific functions are numbered in FIG. 2 with specific numbers for descriptive purposes, e.g., specifically referencing such keys.

It should be noted that according to various approaches, one or both of the groups 210, 214 of virtual ambiguous keys 212 may be resized, e.g., in response to detecting one or more resizing gestures, e.g., as previously described in method 100.

In such an updating of size, the starting location of a resizing gesture may be anchored to a bottom corner edge of the touch-sensitive input area 208. In some approaches, when the resized size of the groups 210, 214 of virtual ambiguous keys 212 are big enough, some virtual ambiguous keys 212 may overlap. For example, the virtual ambiguous key 220 may include what was previously two separate keys. In some approaches, in response to such overlapping, one or more virtual ambiguous keys 212 may disappear, or at least portions thereof. Of course the functionalities of the virtual ambiguous keys 212 that disappear may be transitioned to other virtual ambiguous keys 212. In other embodiments, the overlapping virtual ambiguous keys 212 may be partially or entirely merged.

With continued reference to FIG. 2, in one approach, system 200 includes a detected first touch event, which in the present approach includes a gesture 228 (with a starting location 230 and an ending location 232) and a series of tap events 234, 236, 238. The first touch event is detected on the touch-sensitive input area 208 of the display 204. Moreover, system 200 includes a determined plurality of words based on the detected first touch event. For example, three of such determined words (rock, small, pocket) are shown output to a first list 240 on a first portion 242 of the display 204 and a second list 244 on a second portion 246 of the display 204.

As described elsewhere herein, at least two of the determined words may be output to a single list on a single portion of the display. However, in the present approach, two lists 240, 244 are shown for purposes of an example.

It should be noted that outputting at least two of the determined words to the second list 244 on the second portion 246 of the display 204 may further promote streamlined text input on the device 202. For example, in one approach, one skilled in the art, upon reading the present descriptions, will understand and appreciate that a user will be able to maintain focus and context while typing on the touch sensitive input area 208 at least in part as a result of at least two of the determined words being output to the location of a cursor on the display 204, e.g., cursor 260, while typing on the touch sensitive input area 208. This is because in some approaches, it may be assumed that a user of the device 202 will already be viewing the location of a cursor on the display 204, e.g., cursor 260 while typing on the touch sensitive input area 208. Accordingly, in one approach, a user will for the most part, not have to adjust his/her viewing of the display 204 from a cursor location on the display 204 while typing thereon.

For descriptive purposes, note that each of the characters of the word "small" correspond to characters of various virtual ambiguous keys 212 that were based on the gesture 228 and tap events 234, 236, 238, e.g. the first touch event being detected on each of the virtual ambiguous keys 212 containing the characters "PQRS" "MNO" "ABC" and "JKL" although not necessarily in that order. Moreover, the determined word "rock" also contains characters from each of such virtual ambiguous keys 212. Moreover, "pock" of the determined word "pocket" also includes characters from the virtual ambiguous keys containing the characters "PQRS" "MNO" "ABC" and "JKL."

It may be noted that the initial orders of the lists 240, 244 include an emphasized determined word, e.g., small, that most correlates with the gesture 228 and/or first touch event. In the current approach, the emphasizing includes centering the word "small" in the lists 240, 244 and moreover underlining at least a portion of the word, e.g., underlined "sma" of "small".

In the current approach, system 200 moreover includes a detected gesture based second touch event 248 (having a starting location 250 and an ending location 252) in a predefined area 254 (defined as the area of the virtual ambiguous key 220) of the touch-sensitive input area 208. In response to detecting the gesture based second touch event 248 in the predefined area 254, the first list 240 and/or the second list 244 may be changed on the display 204.

It should be noted that touch event borders may be output to the display in response to detecting a touch event. For example, see touch event borders 256, 258 of the detected gesture based second touch event 248.

In another approach, at least one of the words in the first list 240 and/or the second list 244, may be output to a second portion of the display 204 in response to detecting a tap based second touch event in an area of the display. In one approach the area may include the predefined area 254. In another approach, the area may include the first portion 242 of the display 204. In yet another approach, the area may include the second portion 246 of the display 204.

Figure 3A:
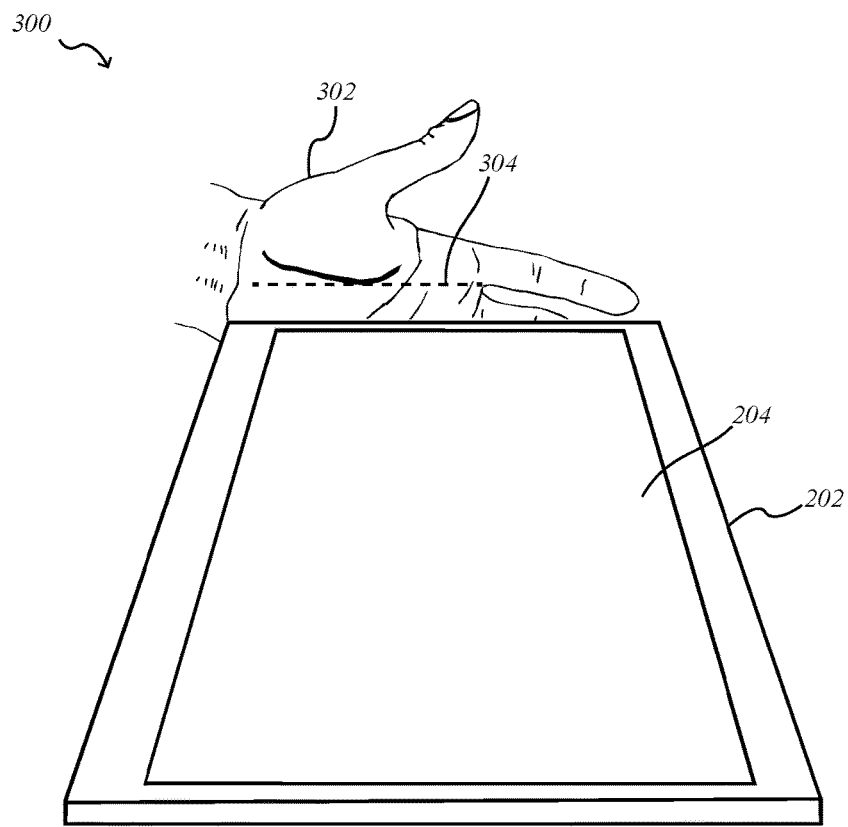
FIG. 3A is an angled front side view of a touch-sensitive display and a user's hand, in accordance with one embodiment.
Figure 3B:
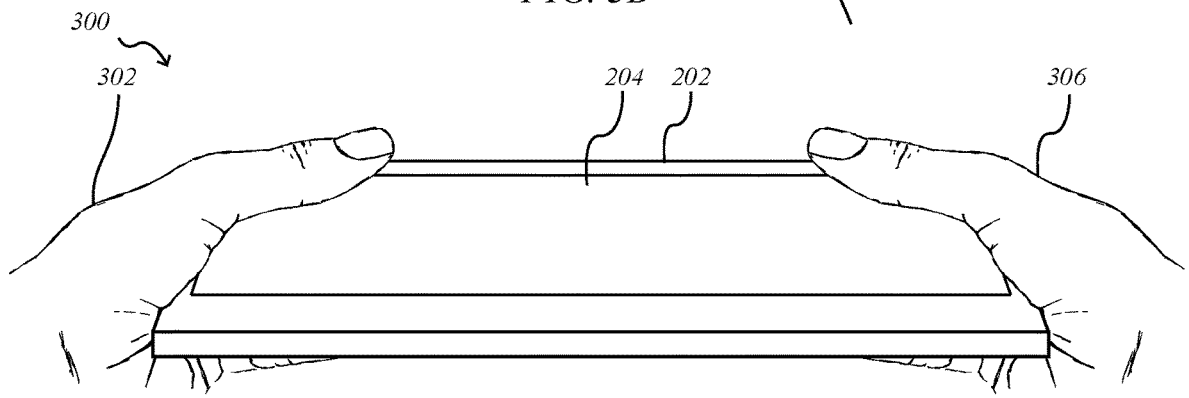
FIG. 3B is an angled front side view of a touch-sensitive display and a user's hands, in accordance with one embodiment.
Figure 3C:
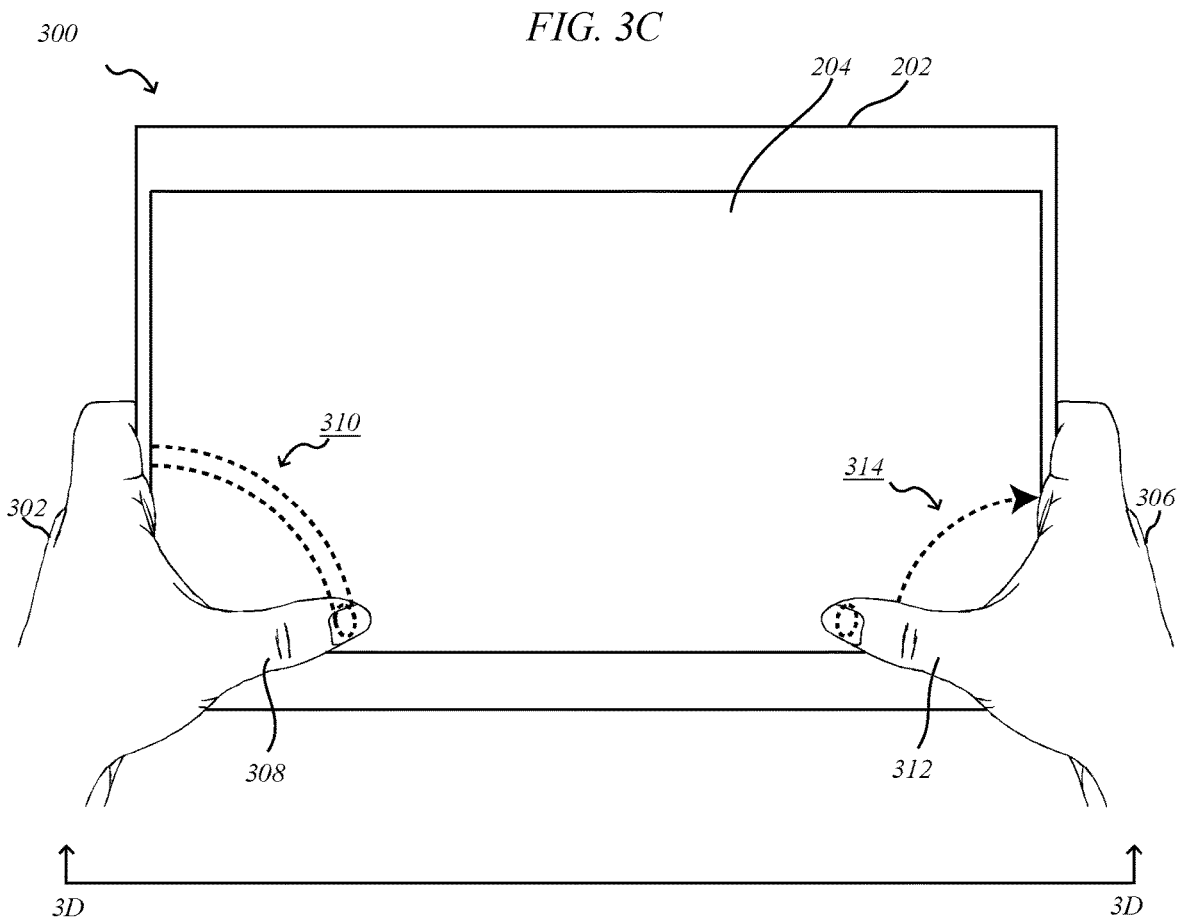
FIG. 3C is a front side view of a touch-sensitive display and a user's hands, in accordance with one embodiment.
Figure 3D:
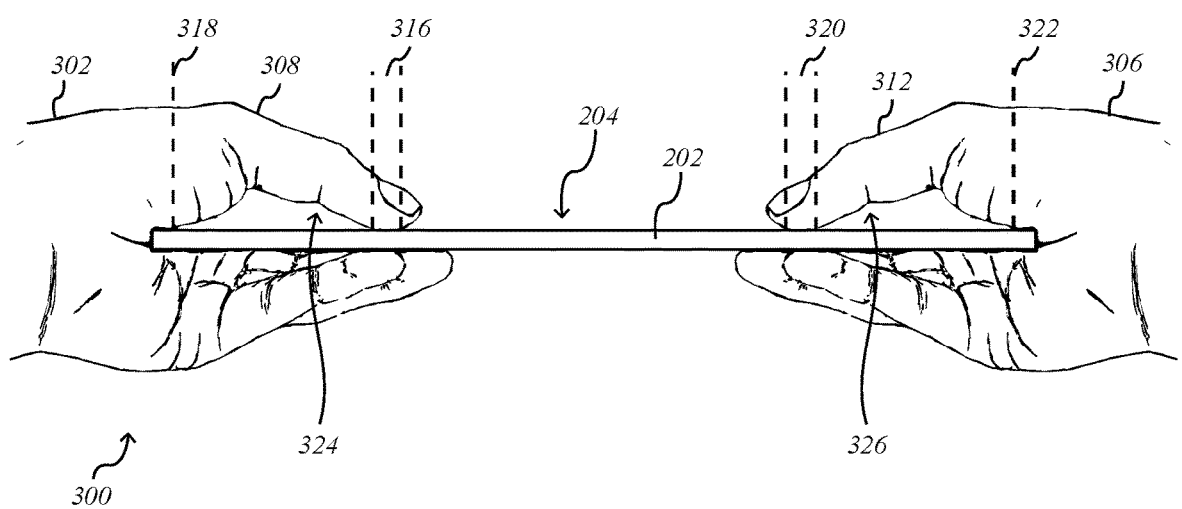
FIG. 3D is a side view of a touch-sensitive display and a user's hands, taken along line 3D of FIG. 3C, in accordance with one embodiment.
Figure 3E:
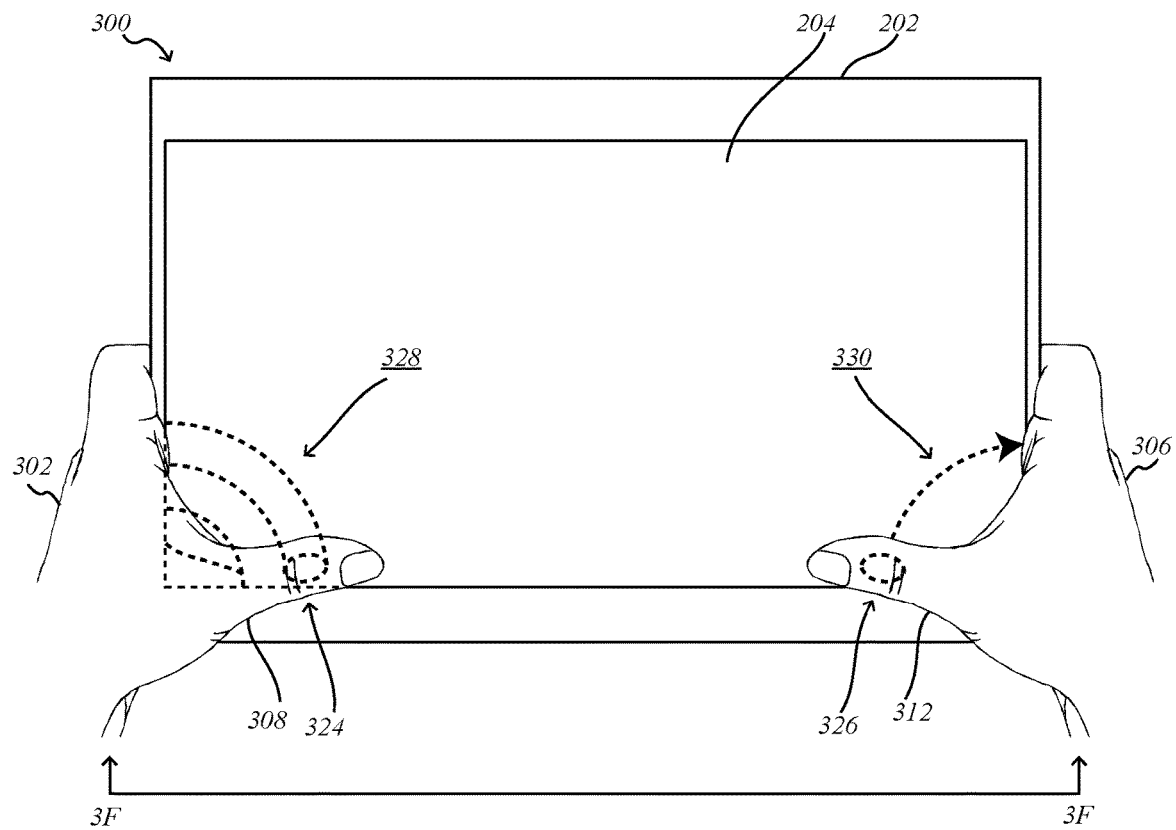
FIG. 3E is a front side view of a touch-sensitive display and a user's hands, in accordance with one embodiment.
Figure 3F:
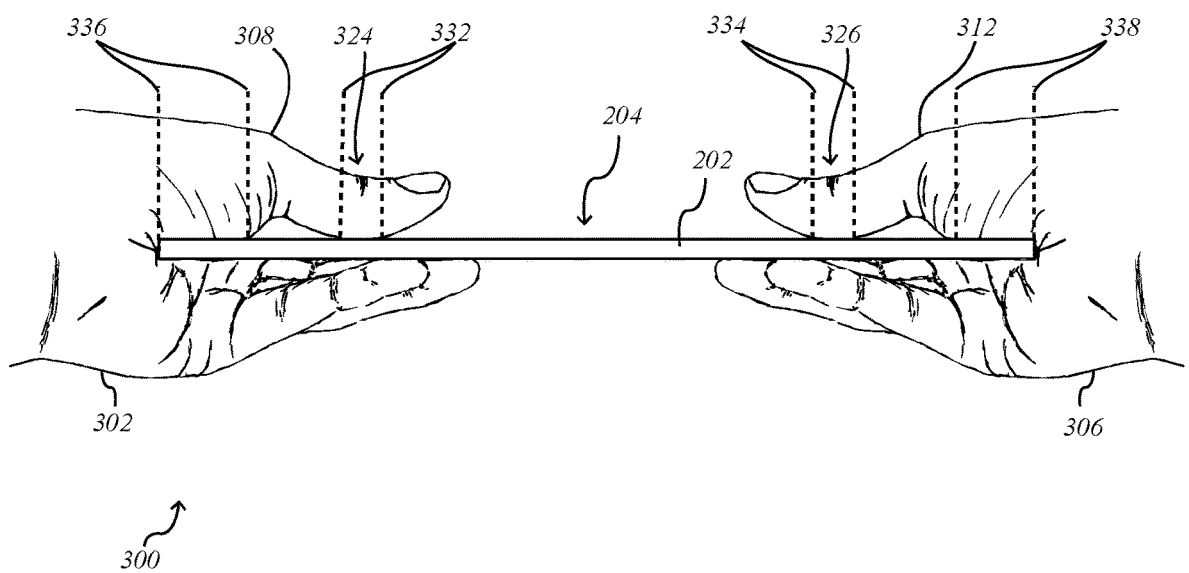
FIG. 3F is a side view of a touch-sensitive display and a user's hands, taken along line 3F of FIG. 3E, in accordance with one embodiment.
Figure 3G:
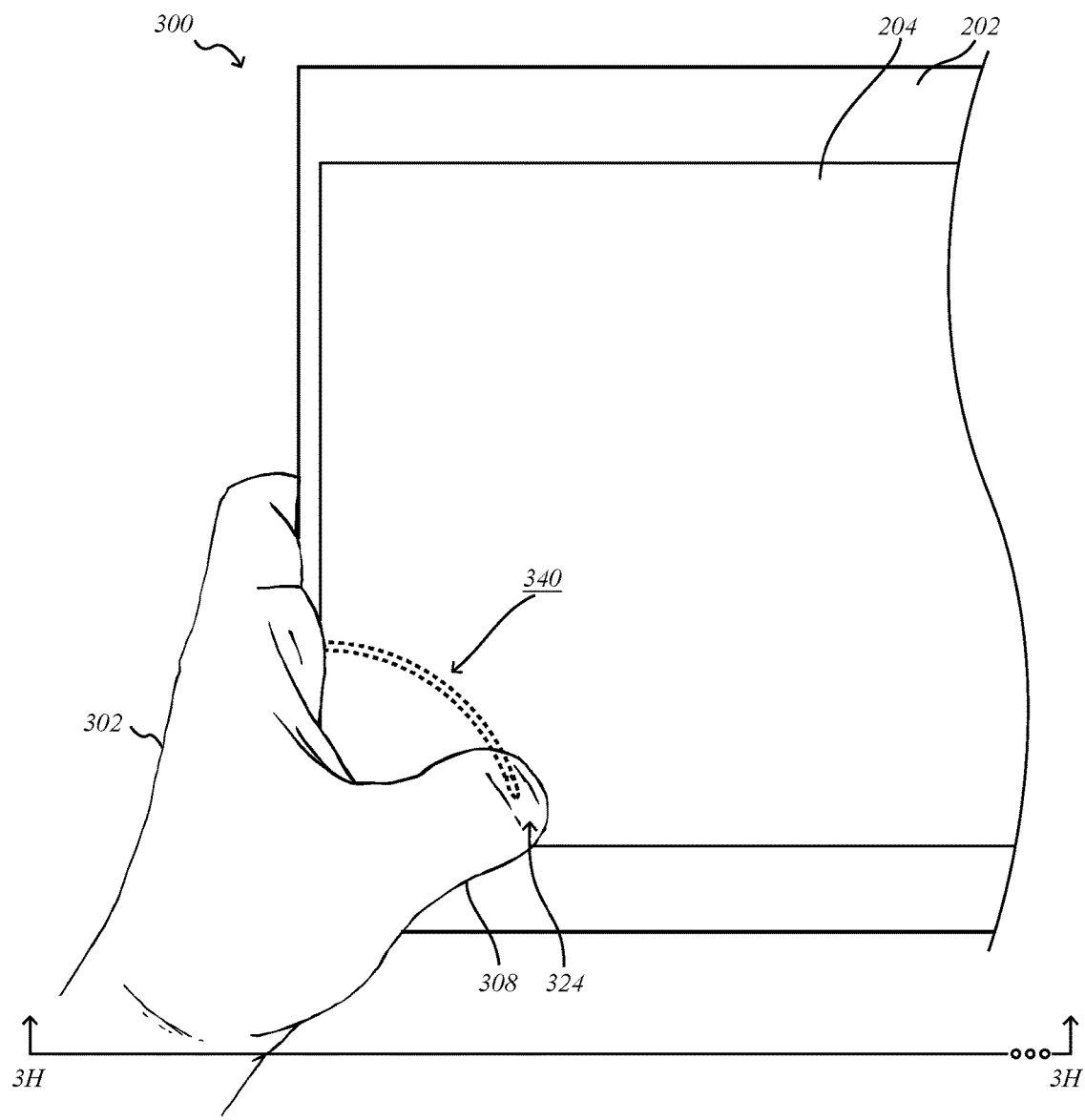
FIG. 3G is a partial front side view of a touch-sensitive display and a user's hand, in accordance with one embodiment.
Figure 3H:
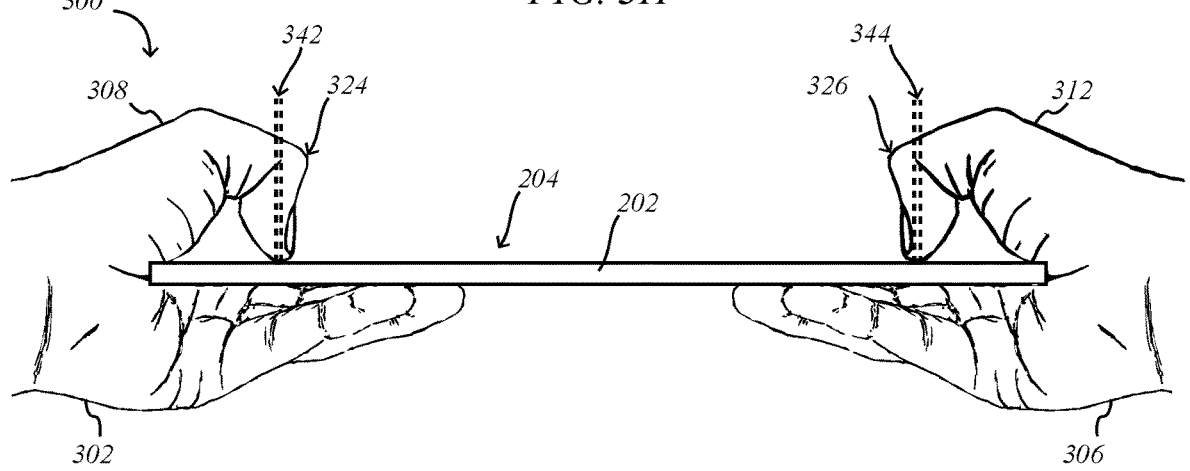
FIG. 3H is a side view of a touch-sensitive display and a user's hands, taken along line 3H of FIG. 3G, in accordance with one embodiment.
Figure 3I:
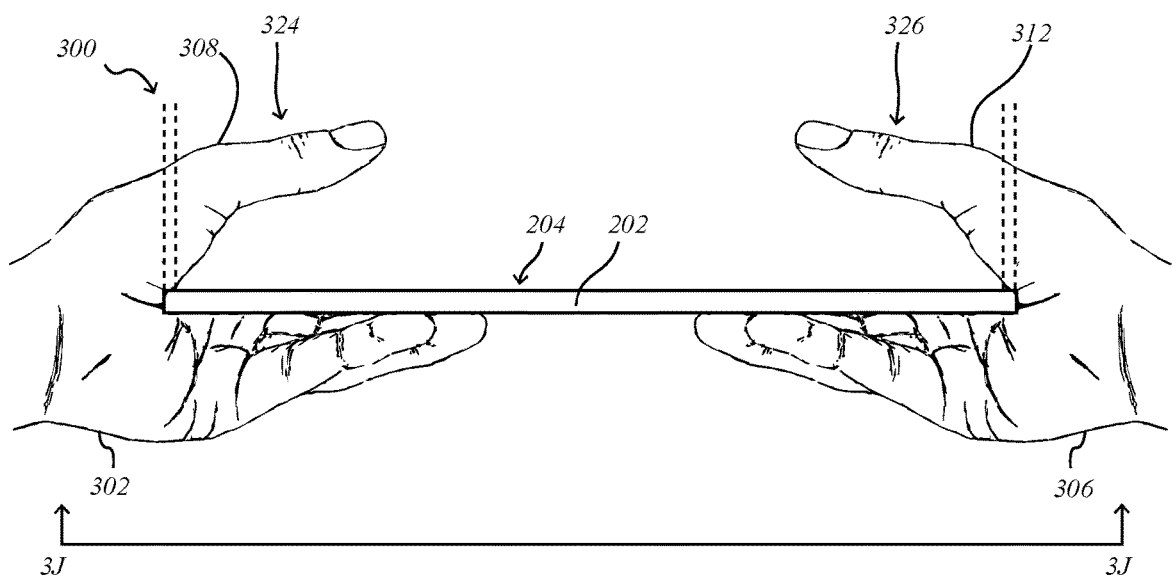
FIG. 3I is a front side view of a touch-sensitive display and a user's hands, in accordance with one embodiment.
Figure 3J:
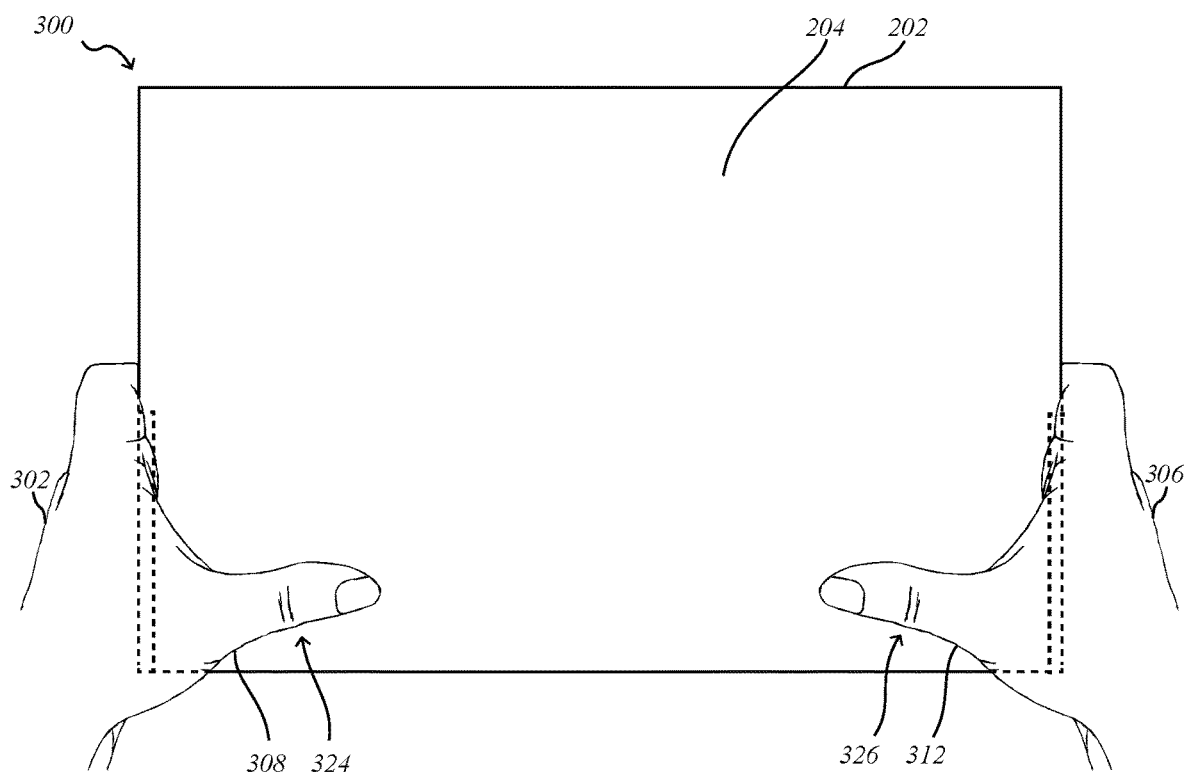
FIG. 3J is a front side view of a touch-sensitive display and a user's hands, taken along line 3J of FIG. 3I, in accordance with one embodiment.
Figure 3K:
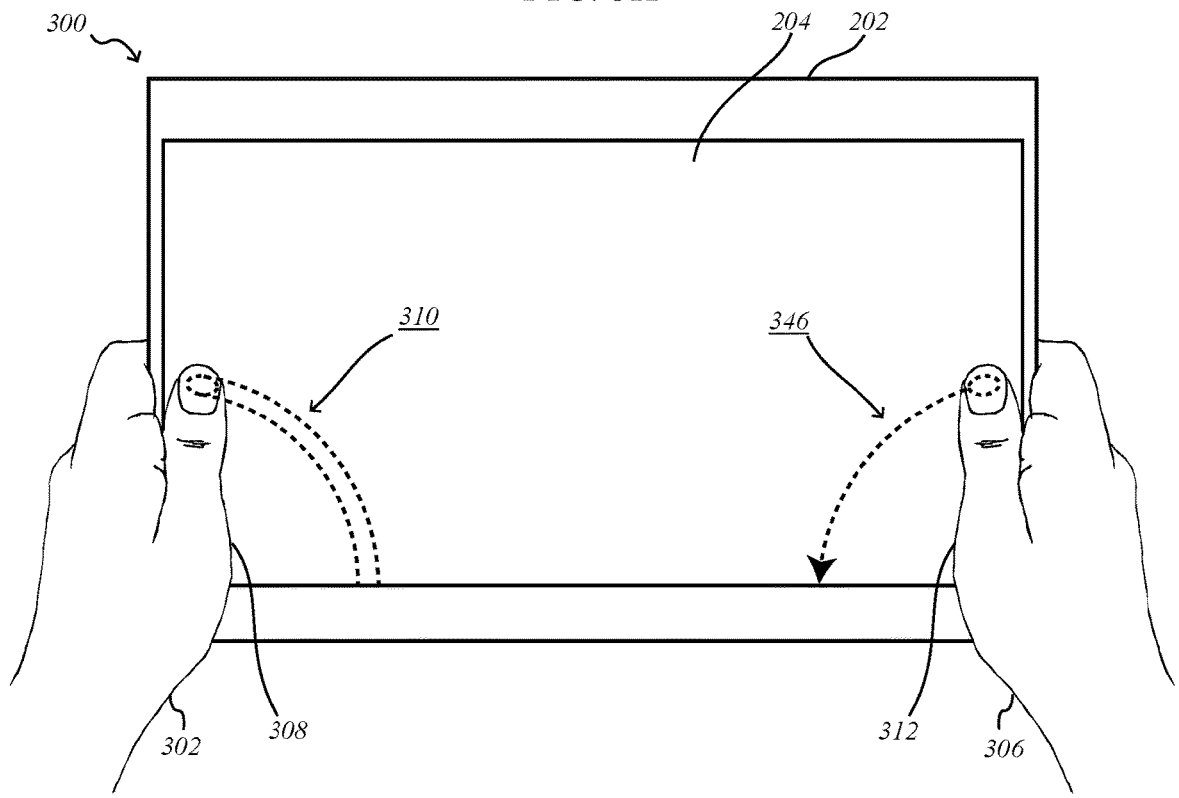
FIG. 3K is a front side view of a touch-sensitive display and a user's hands, in accordance with one embodiment.
Figure 3L:
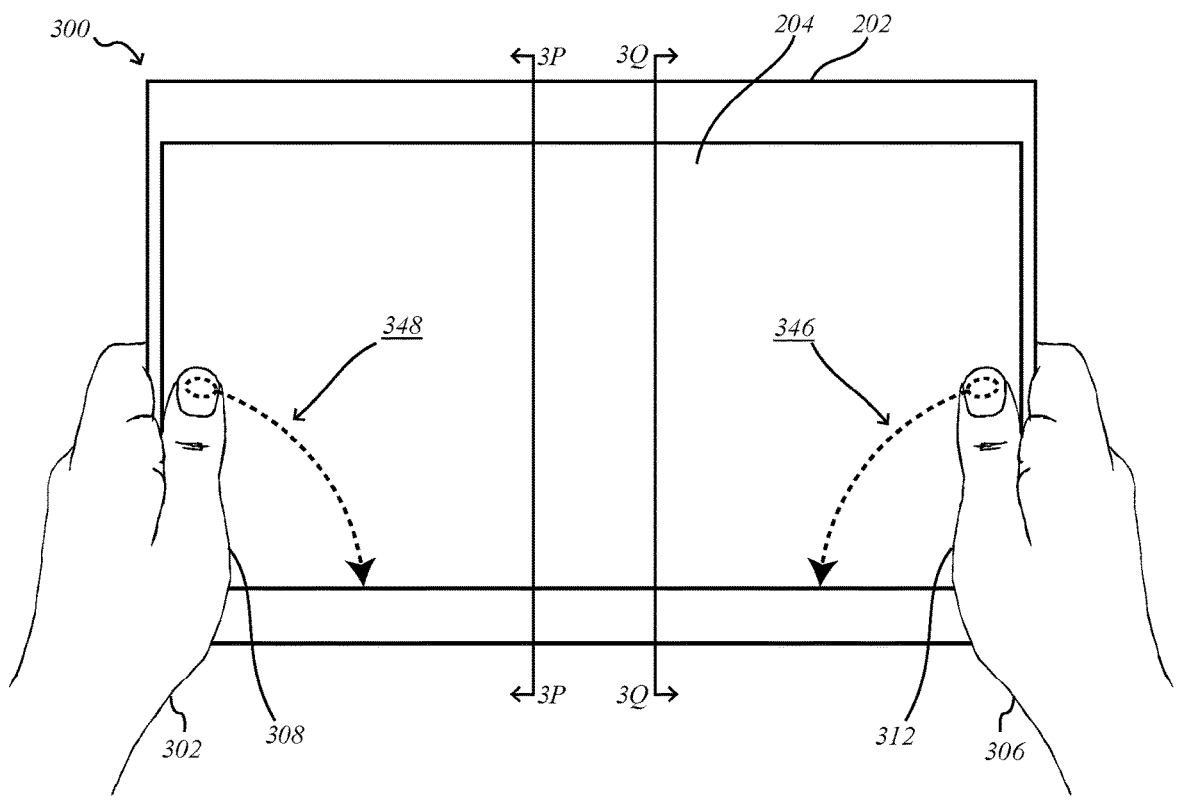
FIG. 3L is a front side view of a touch-sensitive display and a user's hands, in accordance with one embodiment.
Figure 3O:
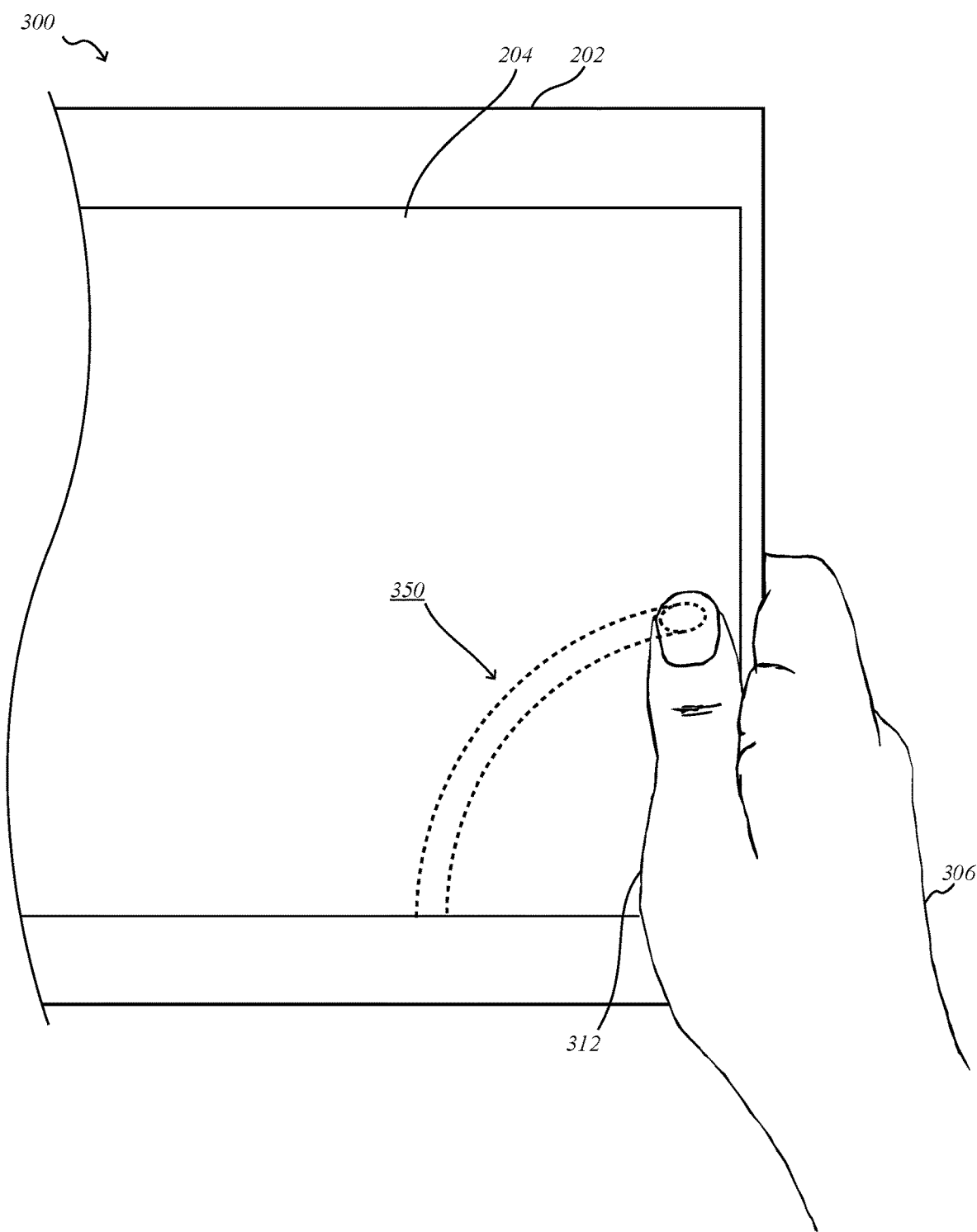
FIG. 3O is a partial front side view of a touch-sensitive display and a user's hand, taken along line 3O of FIG. 3M, in accordance with one embodiment.
Figure 3P:
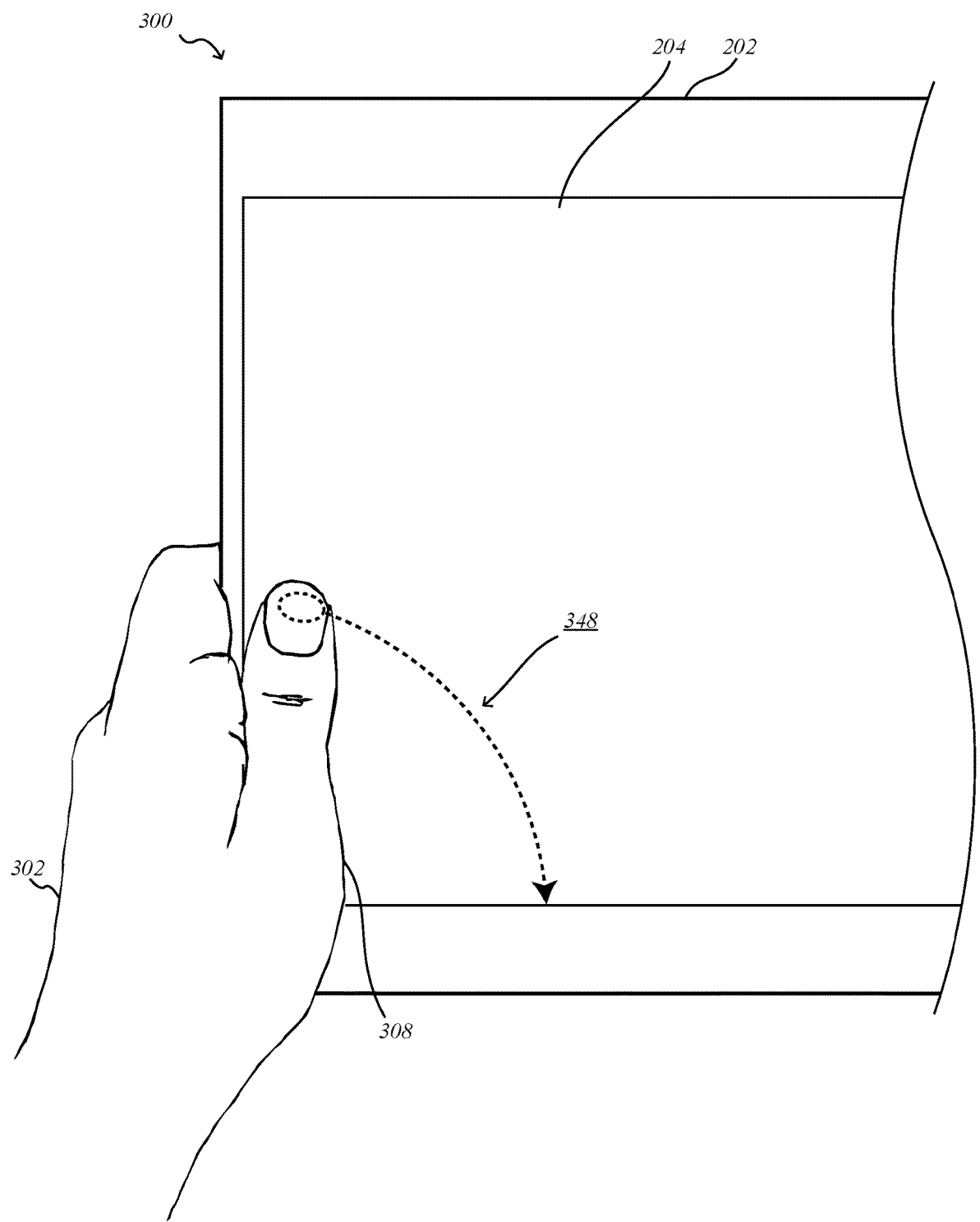
FIG. 3P is a partial front side view of a touch-sensitive display and a user's hand, taken along line 3P of FIG. 3L, in accordance with one embodiment.
Figure 3Q:
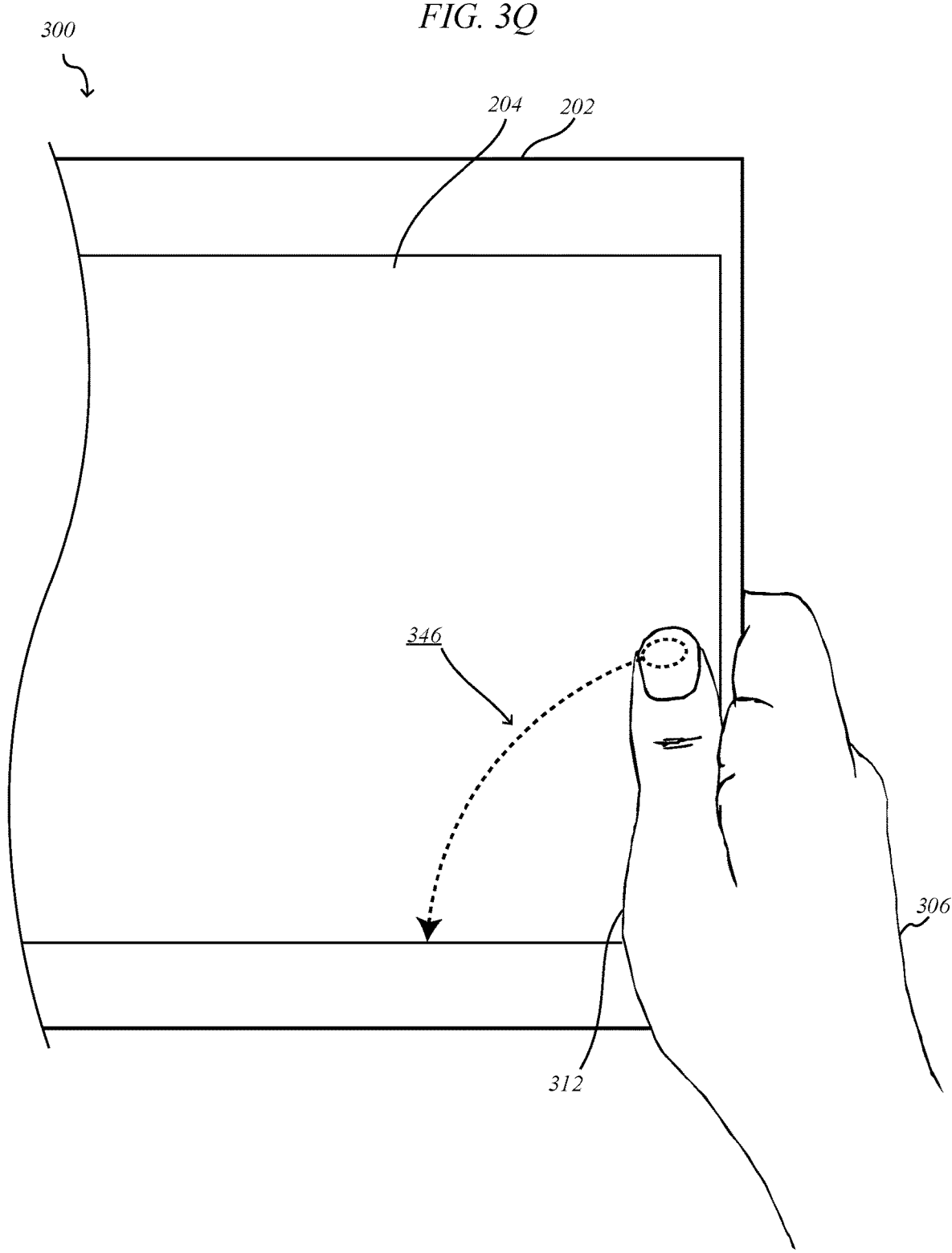
FIG. 3Q is a partial front side view of a touch-sensitive display and a user's hand, taken along line 3Q of FIG. 3L, in accordance with one embodiment.

FIGS. 3A-3Q illustrate representation 300, in accordance with various embodiments. As an option, the present representation 300 may be implemented in conjunction with features from any other embodiment listed herein, such as those described with reference to the other FIGS. Of course, however, such representation 300 and others presented herein may be used in various applications and/or in permutations which may or may not be specifically described in the illustrative embodiments listed herein. Further, the representation 300 presented herein may be used in any desired environment.

It should be noted that any of FIGS. 3A-3Q may share common numberings with FIG. 2 and/or one or more other FIGS., e.g., for similar functionalities and/or components.

Referring first to FIG. 3A, representation 300 includes a device 202 having a display 204. A user's hand 302 is shown preparing to engage (grip) with the device, e.g., along contact axis 304.

With reference now to FIG. 3B, representation 300 illustrates a user's hands 302, 306 gripping the device 202.

Now referring to FIG. 3C, representation 300 includes a first circumferential gesture movement 310 made by a user's thumb 308 of hand 302. Moreover, a second circumferential gesture movement 314 is made by a user's thumb 312 of hand 306. Such gesture movements 310, 314 may be detected as a gesture based touch events, e.g., in accordance with method 100.

FIG. 3D illustrates a cross sectional view of representation 300 in one approach, taken along line 3D of FIG. 3C. In one approach, axes 316 show the width of the portion of the user's thumb 308 that contacts the display 204 of the device 202. Moreover axis 318 illustrates a location on the device 202 at which a center point of virtual ambiguous keys (not shown) of the display 204 may be located in the present approach. Of course the portion and/or width of the thumb 308 that contacts the display 204 and/or the location of the center point of virtual ambiguous keys of the display 204 may be different depending on the approach and/or touch event. In one approach, axes 320 show the width of the portion of the user's thumb 312 that contacts the display 204 of the device 202. Moreover axis 322 illustrates a location on the device 202 at which a center point of virtual ambiguous keys (not shown) of the display 204 may be located in the present approach. Of course the portion and/or width of the thumb 312 that contacts the display 204 and/or the location of the center point of virtual ambiguous keys of the display 204 may be different depending on, e.g., the approach, the embodiment, the touch event, etc.

It should be noted the portions of the thumbs 308, 312, that contact the display 204 may be portions of the thumbs above (in a direction towards the tip of the thumb) the inter-phalangeal joints 324, 326 of the thumbs 308, 312 (respectively).

Referring now to FIG. 3E, the user's hands 302, 306 are shown making circumferential gesture movements 328, 330 (respectively). During such movements, it may be noted that detected touch events associated with the circumferential gesture movements 328, 330 may detect, a portion of the thumb at and/or below (in a direction away from the tip of the thumb) the inter-phalangeal joints 324, 326 of the thumbs 308, 312 (respectively).

FIG. 3F illustrates a cross sectional view of representation 300 in one approach, taken along line 3F of FIG. 3E. In one approach, axes 332 and axes 334 show the widths of the portions of the user's thumbs 308, 312 (respectively) that contact the display 204 of the device 202. Moreover axes 336 and axes 338 illustrate the locations on the device 202 that are contacted by the user's hands 302, 306 in the present approach. It should be noted that in various approaches and/or embodiments described herein, despite such portions of user's thumbs contacting the device 202 and/or display 204 in a handling position, such contact with the device 202 may in some approaches be determined to not be a touch event. For example, a constantly contacted portion of the display 204 (constantly contacted during the performing of one or more operations of method 100 for example) may be determined to not be a touch event and/or disregarded. Moreover, in some approaches, certain portions of the display 204, e.g., such as corner portions of the display 204 that are assumed to be contacted as a result of the handling of the device 202 by a user, may not be used in detecting touch events.

Referring now to FIG. 3G, representation 300 includes a circumferential gesture movement 340 made while a tip of the user's thumb 308 of hand 302 is in contact with the display 204.

FIG. 3H illustrates a cross sectional view of representation 300 taken along line 3H of FIG. 3G. In one approach, axes 342 and axes 344 show the widths of the tip portions of the user's thumbs 308, 312 that contact the display 204 of the device 202.

With reference now to FIG. 3I, representation 300 illustrates an approach in which at least one detected touch event is detected by detecting the presence of a user's finger (thumbs 308, 312) above but not in contact with the display 204. Accordingly, the display may include a front facing camera or some other conventional detection device that may be used to track the position of an object (such as the tip of the user's thumbs 308, 312) distanced within some range from the display 204.

FIG. 3J illustrates a cross sectional view of representation 300 taken along line 3J of FIG. 3I.

Referring now to FIG. 3K, representation 300 includes a first circumferential gesture movement 310 made by a user's thumb 308 of hand 302. Moreover, a second circumferential gesture movement 346 is made by a user's thumb 312 of hand 306. Such gesture movements 310, 346 may be detected as a gesture based touch events, e.g., in accordance with method 100.

Moreover, in FIG. 3L, representation 300 includes a first circumferential gesture movement 348 made by a user's thumb 308 of hand 302, and a second circumferential gesture movement 346, that is made by a user's thumb 312 of hand 306.

In FIG. 3M, representation includes a first circumferential gesture movement 310 that is made by a user's thumb 308 of hand 302, and a second circumferential gesture movement 350, that is made by a user's thumb 312 of hand 306.

FIG. 3N illustrates a slightly zoomed cross sectional view of representation 300 in one approach, taken along line 3N of FIG. 3M. Similarly, FIG. 3O illustrates a slightly zoomed cross sectional view of representation 300 in one approach, taken along line 3O of FIG. 3M.

FIG. 3P illustrates a slightly zoomed cross sectional view of representation 300 in one approach, taken along line 3P of FIG. 3L.

FIG. 3Q illustrates a slightly zoomed cross sectional view of representation 300 in one approach, taken along line 3Q of FIG. 3L.

Figure 4:
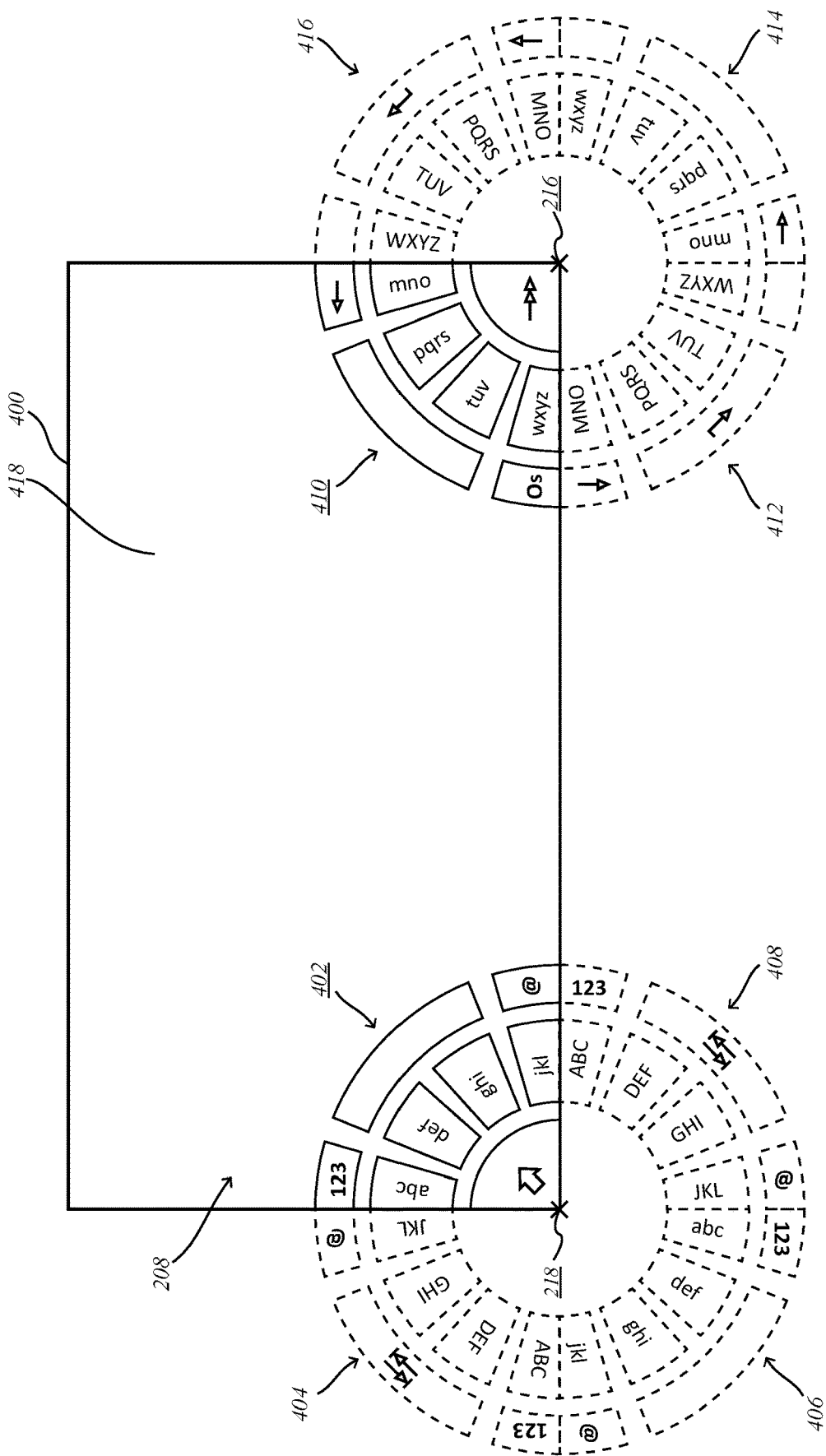
FIG. 4 is a front side view of a touch-sensitive display having groups of virtual ambiguous keys, in accordance with one embodiment.

FIG. 4 illustrates a device 400, in accordance with one embodiment. As an option, the present device 400 may be implemented in conjunction with features from any other embodiment listed herein, such as those described with reference to the other FIGS. Of course, however, such device 400 and others presented herein may be used in various applications and/or in permutations which may or may not be specifically described in the illustrative embodiments listed herein. Further, the device 400 presented herein may be used in any desired environment.

Referring now to FIG. 4, the device 400 includes a display 418. The display includes a touch sensitive input area 208. The display 418 includes a first group of virtual ambiguous keys 402 arranged approximately radially about a center point 218. Moreover, the display 418 includes a second group of virtual ambiguous keys 410 arranged approximately radially about a center point 216.

FIG. 4 further includes representations of groups of characters that are not currently displayed on the groups of virtual ambiguous keys 402, 410, but may be used for updating characters of the groups of virtual ambiguous keys 402, 410, e.g., see groups 404, 406, 408 which may update the characters of the group of virtual ambiguous keys 402 and groups 412, 414, 416 which may update the characters of the group of virtual ambiguous keys 410.

Such an updating of the characters of the groups of virtual ambiguous keys 402, 410 may be performed in response to detecting a predetermined touch event on a predetermined virtual ambiguous key and/or area of the display 418. According to various approaches, an updating of all or some of the characters of the groups of virtual ambiguous keys 402, 410 may be performed in response to detecting a tap event including a predetermined pattern of taps. For example, a detected double-tap may result in the altering of a character case of one or more virtual ambiguous keys of the groups of virtual ambiguous keys 402, 410.

It should be noted that each of the groups 404-408 and 412-416 preferably include characters for four virtual keys. For example, in the present approach, every four dashed keys (dashing thereby representing that such characters are not currently displayed) of each of the groups 404-408 and 412-416 alter character case between uppercase and lowercase characters, e.g., characters "mno" "pqrs" "tuv" "wxyz" of the group 414, "abc" "def" "ghi" "jkl" of the group 406, "ABC" "DEF" "GHI" "JKL" of the group 404, etc. In one approach, altering of the character case of characters between uppercase and lowercase may be automatically performed in response to determining that the current word or string of characters output to a second portion of the display (e.g. see method 100) begin a new sentence, in response to determining that the current word or string of characters output to a second portion of the display follow the first word of a sentence, etc. For reference, in one approach a second portion of the display 418 may be any portion of the display 418 that does not display a virtual ambiguous key.

Figure 5:
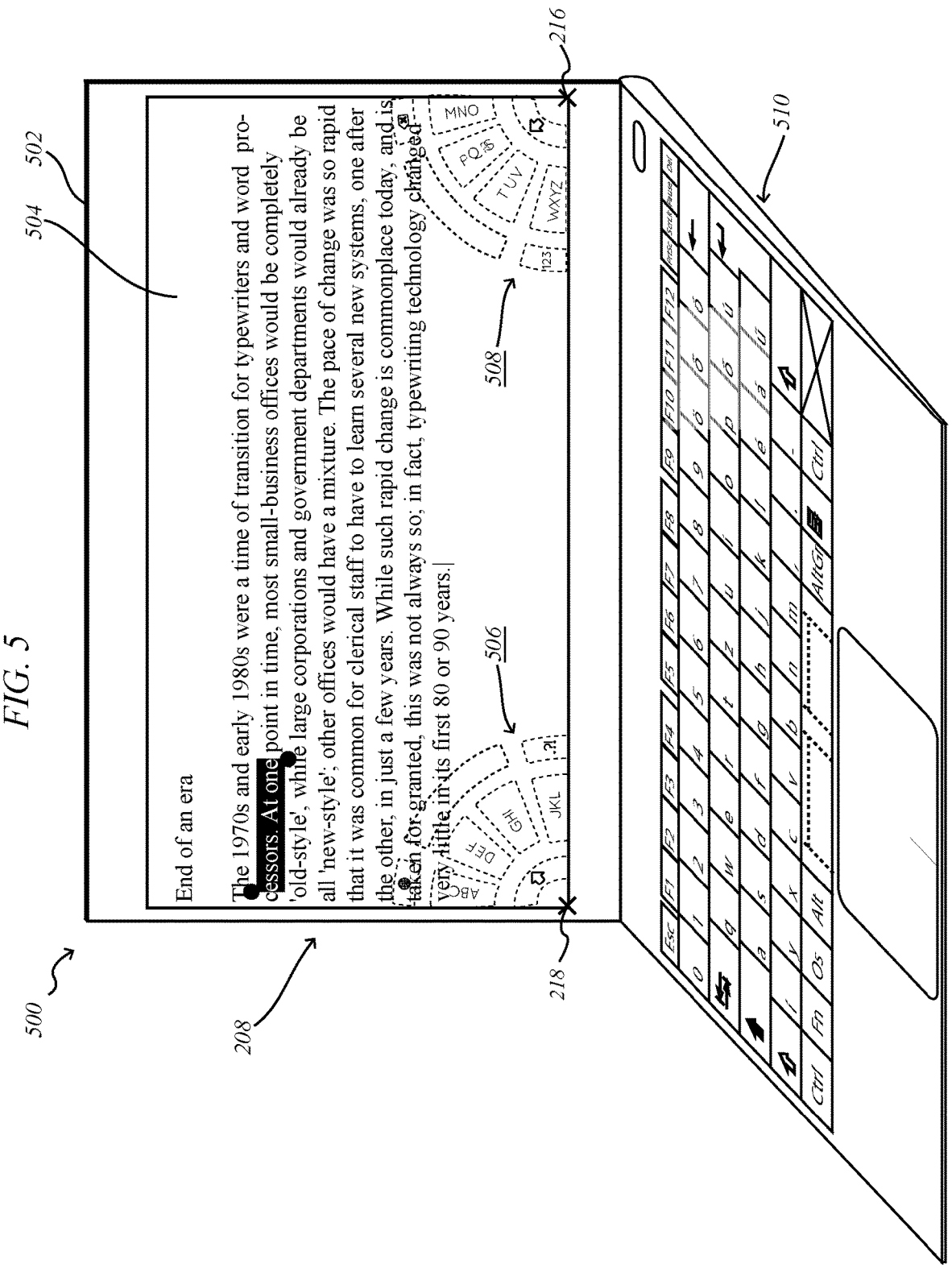
FIG. 5 is a front side view of a touch-sensitive display having groups of virtual ambiguous keys, and a physical keyboard, in accordance with one embodiment.

FIG. 5 illustrates a system 500, in accordance with one embodiment. As an option, the present system 500 may be implemented in conjunction with features from any other embodiment listed herein, such as those described with reference to the other FIGS. Of course, however, such system 500 and others presented herein may be used in various applications and/or in permutations which may or may not be specifically described in the illustrative embodiments listed herein. Further, the system 500 presented herein may be used in any desired environment.

System 500 includes a device 502 having a display 504. In one approach, the device 502 may be similar to the device of representation 300, however, in the present approach, the device 502 is shown detachably coupled to a physical keyboard 510. Of course in some approaches, the device 502 may be fixedly coupled to a physical keyboard 510

The display 504 includes a touch-sensitive input area 208 having a first group of virtual ambiguous keys 506 arranged approximately radially about a center point 218, and a second group of virtual ambiguous keys 508 arranged approximately radially about a second center point 216.

It should be noted that the virtual ambiguous keys of the groups 506, 508 are dashed to illustrate that in some approaches, some or all of the virtual ambiguous keys may be at least temporarily visually omitted (but remain functionally present, e.g., the device 502 is still able to detect touch events on the touch sensitive input area 208) from touch-sensitive input area 208. This may be for eye-free typing, e.g., such as when a user is familiar with and has memorized the layout of the virtual ambiguous keys and/or the approximate locations of such keys previously visually output (but now only functionally output) on the display 504.

Figure 6:
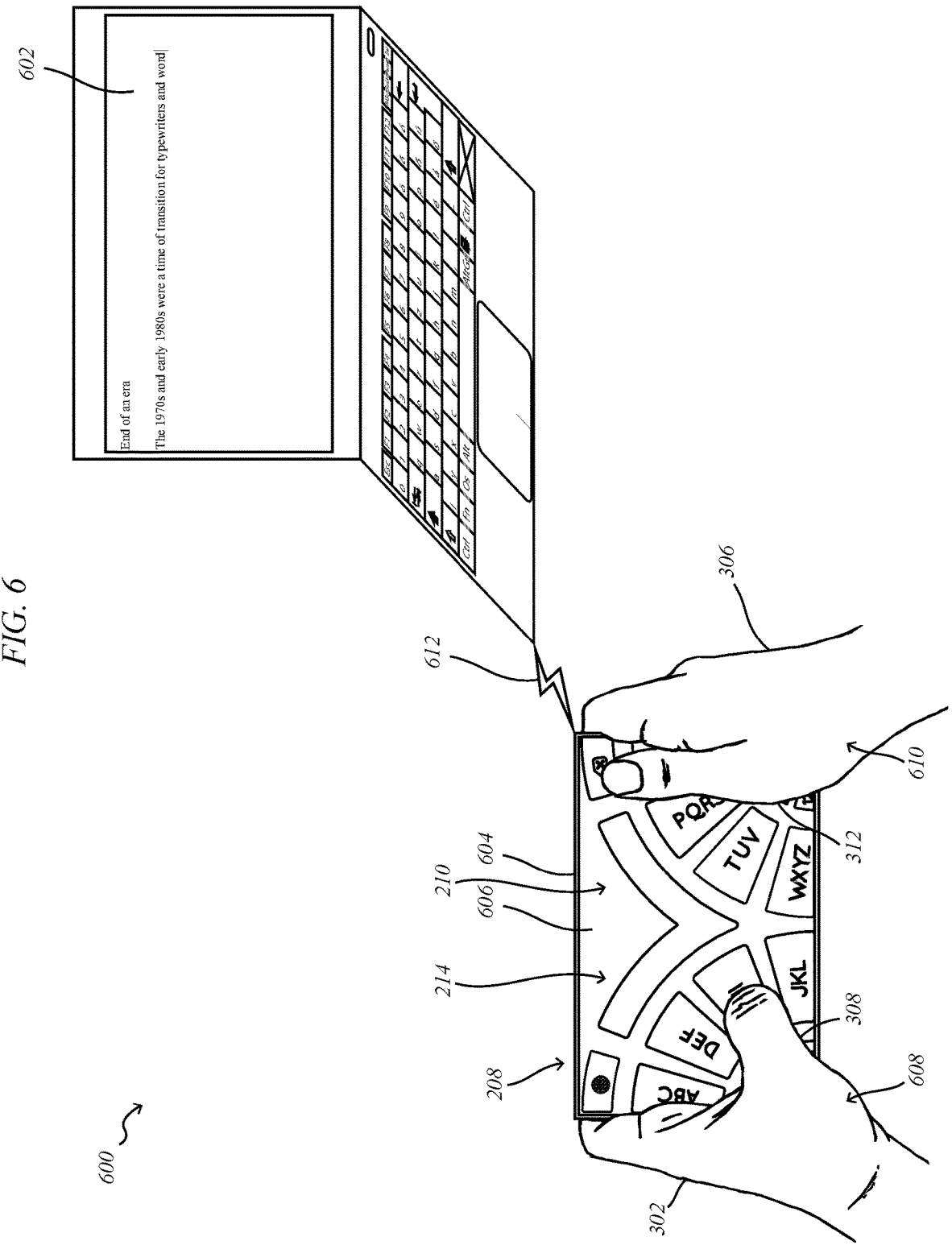
FIG. 6 is an angled front view of a touch-sensitive display having groups of virtual ambiguous keys, and a display with a keyboard, in accordance with one embodiment.

FIG. 6 illustrates a system 600, in accordance with one embodiment. As an option, the present system 600 may be implemented in conjunction with features from any other embodiment listed herein, such as those described with reference to the other FIGS. Of course, however, such system 600 and others presented herein may be used in various applications and/or in permutations which may or may not be specifically described in the illustrative embodiments listed herein. Further, the system 600 presented herein may be used in any desired environment.

System 600 includes a device 604 having a display 606 having a touch-sensitive input area 208. The touch-sensitive input area 208 has groups of virtual ambiguous keys 214, 210 arranged approximately radially about center points (at about the position of the thumb joints 608, 610 (respectively) when engaged in typing on the touch-sensitive input area 208).

System 600 includes a second display 602, e.g., hardwired and/or wirelessly coupled/in communication with the device 604. According to various approaches, words determined from detected touch events on the touch-sensitive input area 208 may be output for display on the first display 606 and/or output for display on the second display 602.

Figure 7:
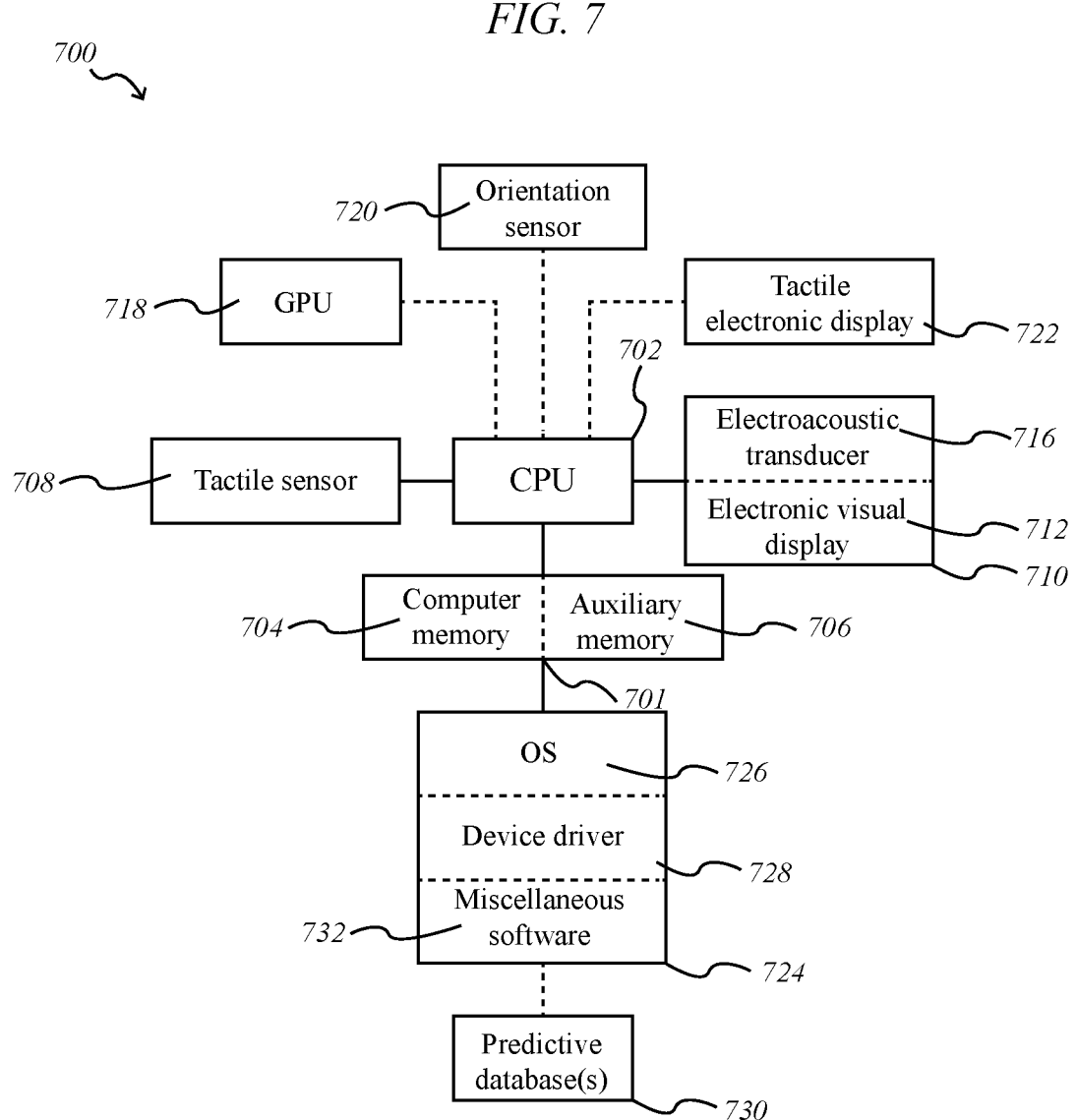
FIG. 7 is an overview of a network architecture, in accordance with one embodiment.

FIG. 7 illustrates a network architecture 700, in accordance with one embodiment. As an option, the present network architecture 700 may be implemented in conjunction with features from any other embodiment listed herein, such as those described with reference to the other FIGS. Of course, however, such network architecture 700 and others presented herein may be used in various applications and/or in permutations which may or may not be specifically described in the illustrative embodiments listed herein. Further, the network architecture 700 presented herein may be used in any desired environment.

It should be noted that according to various approaches, network architecture 700 may be used in accordance with various, e.g., devices, operations, decisions, etc., described elsewhere herein. Accordingly, the network architecture 700 may include one or more components that may be present in a device performing method 100, or any other embodiments and/or approaches described elsewhere herein.

Referring now to FIG. 7, network architecture 700 includes a central processing unit (CPU) 702. The CPU 702 may be used in accordance with processing any one or more operations, decisions, actions, outputs described herein. Moreover, in one approach, network architecture 700 may include a graphical processing unit (GPU) 718. The GPU 718 may be used in accordance with any graphical display described in various embodiments and/or approaches elsewhere herein.

It should be noted that the dashed lines (e.g., see dashed line connecting the GPU 718 with the CPU 702 among other dashed lines) of network architecture 700 may in some approaches represent optional components and/or components that may operate independent of other components in the network architecture 700.

Moreover, network architecture 700 includes a tactile electronic display 722. The tactile electronic display 722 may be any type of electronic display and may be configured to operate in accordance with the various examples illustrated in the FIGS. 1-6 and descriptions elsewhere herein. Moreover, an orientation sensor 720 may be in communication with the CPU 702, e.g., for purposes as described elsewhere herein.

With continued reference to FIG. 7, network architecture 700 includes a tactile sensor 708, e.g., which may be configured to be used in accordance with any one or more detected touch events and/or inputs.

Moreover, grouping 710 includes an electroacoustic transducer 716 and an electronic visual display 712.

Grouping 701 includes a computer memory module 704 and an auxiliary memory module 706. Such memory modules may be used for storing any one or more, e.g., received inputs, frequently used words, user behaviors, etc.

Moreover, operational components 724 of various embodiments and/or approaches described elsewhere herein may include an operating system (OS) 726, a device driver 728, and miscellaneous software 732, among any one or more other operational components. For reference in one approach "miscellaneous" may refer to simple known tasks of conventional devices, e.g., save functions, opening a list, dimming the display in response a camera of the device detecting a predetermined amount of sunlight present, etc., that may operate in conjunction with any one or more other portions of the network architecture 700.

Finally, network architecture 700 may include predictive database(s) 730. For example, predictive database(s) 730 may include databases that record frequently determined words (see method 100). According to various approaches, such databases may be specific to, e.g., a particular user, a detected touch input pattern, predetermined educational contexts, etc.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   detecting, on a touch-sensitive input area having a first group of virtual ambiguous keys arranged approximately radially about a first center point, a first touch of at least one of the first group of virtual ambiguous keys;
   determining a first plurality of words directly in response to the first touch;
   displaying a second plurality of words to a word option selector list located in a first area of a display, wherein the second plurality of words is a subset of the first plurality of words;
   directly in response to detecting a second touch of at least one of the first group of virtual ambiguous keys, changing at least one of the second plurality of words to create a third plurality of words displayed in the word option selector list located in the first area of the display;
visually emphasizing, in response to the first touch and the second touch, one of the third plurality of words displayed in the word option selector list, wherein the visual emphasis is in the first area of the display;
displaying, directly in response to detecting a third touch on the touch-sensitive input area, the visually emphasized word in the first area of the display to a second area of the display that is different from the first area of the display; and
merging two separate virtual ambiguous keys into a single virtual ambiguous key directly in response to the first group of virtual ambiguous keys being resized.

2. The method of claim 1, wherein a character of one or more of the second plurality of words in the word option selector list is emphasized corresponding to a character selected by the first touch.

3. The method of claim 1, wherein the touch-sensitive input area has a second group of virtual ambiguous keys arranged approximately radially about a second center point, wherein the second group of virtually ambiguous keys are different than the first group of virtually ambiguous keys.

4. The method of claim 1, wherein the third touch on the touch-sensitive input area is a swipe gesture that changes the emphasized word in the word option selector list prior to displaying the emphasized word in the second area of the display.

5. The method of claim 1, wherein the first group of virtual ambiguous keys are resized according to a swipe gesture starting at a first location on the touch-sensitive input area and ending at a second location on the touch-sensitive input area.

6. The method of claim 1, wherein the emphasized word is determined to be most probable for displaying in the second area based on a degree of correlation with the first touch and the second touch.

7. The method of claim 1, wherein the first touch includes a touch of a first virtual ambiguous key representing more than one character and the second touch includes a touch of a second virtual ambiguous key representing more than one character.

8. The method of claim 1, further comprising causing one of the virtual ambiguous keys of the first group of virtual ambiguous keys to disappear directly in response to resizing the first group of virtual ambiguous keys.

9. A non-transitory computer readable storage medium having stored thereon instructions configured to cause a processor of a computer to perform operations comprising:
detecting, on a touch-sensitive input area having a first group of virtual ambiguous keys arranged approximately radially about a first center point, a first touch of at least one of the first group of virtual ambiguous keys[[, wherein one or more characters visually displayed on the first group of virtual ambiguous keys are changed from uppercase to lowercase directly in response to the first touch]];
determining a first plurality of words directly in response to the first touch;
displaying a second plurality of words to a word option selector list located in a first area of a display, wherein the second plurality of words is a subset of the first plurality of words;
directly in response to detecting a second touch of at least one of the first group of virtual ambiguous keys, changing at least one of the second plurality of words to create a third plurality of words displayed in the word option selector list located in the first area of the display;
visually emphasizing, in response to the first touch and the second touch, one of the third plurality of words displayed in the word option selector list, wherein the visual emphasis is in the first area of the display; and
displaying, directly in response to detecting a third touch on the touch-sensitive input area, the visually emphasized word in the first area of the display to a second area of the display that is different from the first area of the display; and
merging two separate virtual ambiguous keys into a single virtual ambiguous key directly in response to the first group of virtual ambiguous keys being resized.

10. The non-transitory computer readable storage medium of claim 9, wherein the touch-sensitive input area has a second group of virtual ambiguous keys arranged approximately radially about a second center point, wherein the second group of virtually ambiguous keys are different than the first group of virtually ambiguous keys.

11. The non-transitory computer readable storage medium of claim 9, wherein the third touch on the touch-sensitive input area is a swipe gesture that changes the emphasized word in the word option selector list prior to displaying the emphasized word in the second area of the display.

12. The non-transitory computer readable storage medium of claim 9, wherein the first group of virtual ambiguous keys are resized according to a swipe gesture starting at a first location on the touch-sensitive input area and ending at a second location on the touch-sensitive input area.

13. The non-transitory computer readable storage medium of claim 9, wherein a character of one or more of the displayed words in the word option selector list is emphasized corresponding to a character selected by the first touch.

14. The non-transitory computer readable storage medium of claim 9 having stored thereon instructions configured to cause a processor of a computer to perform operations further comprising [[merging two separate virtual ambiguous keys into a single virtual ambiguous key directly in response to the first group of virtual ambiguous keys being resized]] changing one or more characters visually displayed on the first group of virtual ambiguous keys from uppercase to lowercase directly in response to the first touch.

15. The non-transitory computer readable storage medium of claim 9 having stored thereon instructions configured to cause a processor of a computer to perform operations further comprising causing one of the virtual ambiguous keys of the first group of virtual ambiguous keys to disappear directly in response to resizing the first group of virtual ambiguous keys.

16. A method, comprising:
detecting, on a touch-sensitive input area having a first group of virtual ambiguous keys arranged approximately radially about a first center point, a first touch of at least one of the first group of virtual ambiguous keys[[, wherein one or more characters visually displayed on the first group of virtual ambiguous keys are changed from uppercase to lowercase directly in response to the first touch]];
determining, directly in response to first touch of a first virtual ambiguous key representing a first group of plurality of characters, a plurality of words wherein each of the plurality of words begins with a first character belonging to the first group of plurality of characters;

displaying at least one of the determined plurality of words to a word option selector list located in a first area of a display;

directly in response to detecting a second touch of a second virtual ambiguous key representing a second group of plurality of characters on the touch-sensitive input area, changing the displayed words of the word option selector list, wherein each of the displayed words after the change begins with the first character belonging to the first group of plurality of characters and a second character belonging to the second group of plurality of characters; and visually emphasizing, in response to the first touch and the second touch, one of the displayed words of the word option selector list, wherein the visual emphasis is in the first area of the display; and merging two separate virtual ambiguous keys into a single virtual ambiguous key directly in response to the first group of virtual ambiguous keys being resized.

17. The method of claim 16, wherein a third touch on the touch-sensitive input area is a swipe gesture that changes the emphasized word in the word option selector list prior to displaying the emphasized word in a second area of the display that is different from the first area of the display.

18. The method of claim 16, wherein the first group of virtual ambiguous keys are resized according to a swipe gesture starting at a first location on the touch-sensitive input area and ending at a second location on the touch-sensitive input area.

19. The method of claim 16, further comprising [[merging two separate virtual ambiguous keys into a single virtual ambiguous key directly in response to the first group of virtual ambiguous keys being resized]] changing one or more characters visually displayed on the first group of virtual ambiguous keys from uppercase to lowercase directly in response to the first touch.

20. The method of claim 16, further comprising causing one of the virtual ambiguous keys of the first group of virtual ambiguous keys to disappear directly in response to resizing the first group of virtual ambiguous keys.

* * * * *